(12) United States Patent
Smith et al.

(10) Patent No.: US 8,259,562 B2
(45) Date of Patent: Sep. 4, 2012

(54) WIRING CLOSET REDUNDANCY

(75) Inventors: Michael Smith, San Jose, CA (US);
Jeffrey Wang, Saratoga, CA (US);
Roger Karam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1155 days.

(21) Appl. No.: 11/074,923

(22) Filed: Mar. 7, 2005

(65) Prior Publication Data
US 2006/0077891 A1    Apr. 13, 2006

Related U.S. Application Data

(63) Continuation-in-part of application No. 10/961,865, filed on Oct. 7, 2004, now Pat. No. 7,823,026.

(51) Int. Cl.
*G01R 31/08*    (2006.01)
(52) U.S. Cl. .......................... 370/225; 370/242
(58) Field of Classification Search .................. 370/225, 370/242, 355, 446, 465, 466; 455/402; 714/43, 714/4, 223; 709/223, 238–242
See application file for complete search history.

(56) References Cited

U.S. PATENT DOCUMENTS

| | | | |
|---|---|---|---|
| 4,670,871 A * | 6/1987 | Vaidya | 370/355 |
| 4,835,737 A | 5/1989 | Herrig et al. | |
| 5,122,691 A | 6/1992 | Balakrishnan | |
| 5,148,144 A | 9/1992 | Sutterlin et al. | |
| 5,237,511 A | 8/1993 | Caird et al. | |
| 5,268,592 A | 12/1993 | Bellamy et al. | |
| 5,289,359 A | 2/1994 | Ziermann | |
| 5,331,631 A | 7/1994 | Teraslinna | |
| 5,386,567 A | 1/1995 | Lien et al. | |
| 5,406,260 A | 4/1995 | Cummings et al. | |
| 5,461,671 A | 10/1995 | Sakuragi et al. | |
| 5,483,574 A | 1/1996 | Yuyama | |
| 5,485,465 A * | 1/1996 | Liu et al. | 714/4 |
| 5,491,804 A | 2/1996 | Heath et al. | |

(Continued)

FOREIGN PATENT DOCUMENTS

WO    96/23377 A1    8/1996

OTHER PUBLICATIONS

IEEE Draft P802.3AF/D4.3, Amendment: Data Terminal Equipment (DTE) Power via Media Dependent Interface (MDI), Institute of Electrical and Electronics Engineers, Inc., 132 pages, Apr. 2003.

(Continued)

Primary Examiner — Andrew Lai
(74) Attorney, Agent, or Firm — Patterson & Sheridan, LLP

(57) ABSTRACT

Systems and method for providing redundancy of communications and/or inline power to a powered Ethernet device are disclosed. A redundancy device is configured to receive in-line data and/or power from a plurality of Ethernet relay uplinks and to monitor communications between the relay uplinks. One of the relay uplinks is established as an active state uplink and passes data and/or power to the power device. Responsive to a switchover communication from a redundant uplink, the redundancy device establishes the redundant uplink as the active uplink, thereby passing data and/or power from the redundant uplink to the power device. The relay uplinks may use packet-based communication to sense when there is a failure in a link, and replace a failed device with a redundant device.

20 Claims, 20 Drawing Sheets

U.S. PATENT DOCUMENTS

| | | | |
|---|---|---|---|
| 5,531,612 A | | 7/1996 | Goodall et al. |
| 5,608,792 A | | 3/1997 | Laidler |
| 5,613,130 A | | 3/1997 | Teng et al. |
| 5,639,267 A | | 6/1997 | Loudermilk |
| 5,687,174 A | * | 11/1997 | Edem et al. ............... 370/446 |
| 5,726,506 A | | 3/1998 | Wood |
| 5,742,513 A | | 4/1998 | Bouhenguel et al. |
| 5,758,102 A | | 5/1998 | Carey et al. |
| 5,775,946 A | | 7/1998 | Briones |
| 5,790,391 A | | 8/1998 | Stich et al. |
| 5,790,873 A | | 8/1998 | Popper et al. |
| 5,793,987 A | | 8/1998 | Quackenbush et al. |
| 5,796,185 A | | 8/1998 | Takata et al. |
| 5,808,660 A | | 9/1998 | Sekine et al. |
| 5,809,256 A | | 9/1998 | Najemy |
| 5,834,925 A | | 11/1998 | Chesavage |
| 5,884,086 A | | 3/1999 | Amoni et al. |
| 5,884,233 A | | 3/1999 | Brown |
| 5,983,360 A | * | 11/1999 | Ugajin ....................... 714/11 |
| 5,991,885 A | | 11/1999 | Chang et al. |
| 5,994,998 A | | 11/1999 | Fisher et al. |
| 6,033,266 A | | 3/2000 | Long |
| 6,036,547 A | | 3/2000 | Belopolsky et al. |
| 6,059,581 A | | 5/2000 | Wu |
| 6,068,520 A | | 5/2000 | Winings et al. |
| 6,099,349 A | | 8/2000 | Boutros |
| 6,115,468 A | | 9/2000 | De Nicolo |
| 6,134,666 A | | 10/2000 | De Nicolo |
| 6,162,089 A | | 12/2000 | Costello et al. |
| 6,173,411 B1 | * | 1/2001 | Hirst et al. ................. 714/4 |
| 6,218,930 B1 | | 4/2001 | Katzenberg et al. |
| 6,233,128 B1 | | 5/2001 | Spencer et al. |
| 6,295,356 B1 | | 9/2001 | De Nicolo |
| 6,310,781 B1 | | 10/2001 | Karam |
| 6,396,392 B1 | | 5/2002 | Abraham |
| 6,448,899 B1 | | 9/2002 | Thompson |
| 6,496,105 B2 | | 12/2002 | Fisher et al. |
| 6,541,878 B1 | | 4/2003 | Diab |
| 6,650,622 B1 | | 11/2003 | Austerman, III et al. ..... 370/241 |
| 6,701,443 B1 | | 3/2004 | Bell |
| 6,748,557 B1 | | 6/2004 | Beardsley et al. |
| 6,762,675 B1 | | 7/2004 | Cafiero et al. |
| 6,764,343 B2 | | 7/2004 | Ferentz |
| 6,804,351 B1 | | 10/2004 | Karam |
| 6,865,149 B1 | * | 3/2005 | Kalman et al. ............. 370/225 |
| 6,925,578 B2 | | 8/2005 | Lam et al. |
| 6,938,179 B2 | | 8/2005 | Iyer et al. |
| 6,958,699 B1 | | 10/2005 | Karam |
| 6,986,071 B2 | | 1/2006 | Darshan et al. |
| 6,996,134 B1 | | 2/2006 | Renucci et al. |
| 6,996,458 B2 | | 2/2006 | Pincu et al. |
| 7,058,847 B1 | | 6/2006 | Guzman et al. |
| 7,089,126 B2 | | 8/2006 | Muir |
| 7,107,358 B2 | | 9/2006 | Vasko et al. |
| 7,145,439 B2 | | 12/2006 | Darshan et al. |
| 7,154,381 B2 | | 12/2006 | Lang et al. |
| 7,159,129 B2 | | 1/2007 | Pincu et al. |
| 7,162,377 B2 | | 1/2007 | Amrod et al. |
| 7,194,639 B2 | | 3/2007 | Atkinson et al. |
| 7,221,261 B1 | | 5/2007 | Klingensmith et al. |
| 7,272,746 B2 | | 9/2007 | Deerman et al. |
| 7,299,368 B2 | | 11/2007 | Peker et al. |
| 7,308,612 B1 | | 12/2007 | Bishara |
| 7,370,239 B2 | * | 5/2008 | Apel et al. ................ 714/43 |
| 7,455,527 B2 | | 11/2008 | Nordin et al. |
| 7,504,748 B2 | | 3/2009 | Chang et al. |
| 7,515,526 B2 | | 4/2009 | Elkayam et al. |
| 7,823,026 B2 | | 10/2010 | Karam et al. |
| 2003/0041208 A1 | * | 2/2003 | Volkmar ..................... 710/316 |
| 2003/0095505 A1 | * | 5/2003 | Wells et al. ................. 370/242 |
| 2003/0110288 A1 | * | 6/2003 | Ramanujan et al. .......... 709/238 |
| 2004/0042485 A1 | * | 3/2004 | Gettala et al. ............... 370/465 |
| 2004/0049321 A1 | | 3/2004 | Lehr et al. |
| 2004/0073597 A1 | | 4/2004 | Caveney et al. |
| 2004/0139371 A1 | | 7/2004 | Wilson et al. |
| 2004/0146061 A1 | | 7/2004 | Bisceglia et al. |
| 2004/0260794 A1 | | 12/2004 | Ferentz et al. |
| 2005/0132240 A1 | | 6/2005 | Stineman et al. |
| 2005/0165032 A1 | | 7/2005 | Norman et al. |
| 2005/0197094 A1 | | 9/2005 | Darshan et al. |
| 2005/0257262 A1 | | 11/2005 | Matityahu et al. |
| 2006/0019629 A1 | * | 1/2006 | Berson et al. ................ 455/402 |
| 2006/0117212 A1 | | 6/2006 | Meyer et al. |
| 2006/0239183 A1 | | 10/2006 | Robitaille et al. |

OTHER PUBLICATIONS

"IEEE Standard 802.3af.sup.TM", IEEE Standard for Information Technology—Telecommunications and Information Exchange Between Systems—Local and Metropolitan Area Networks—Specific Requirement, IEEE the Institute of Electrical and Electronics Engineering, Inc., Jun. 18, 2003.

"3Com.RTM. NJ100 Network Jack Power", printed from http://www.poweroverethernet.com/manual/content/view/full/776/,3Com, Tuesday, Mar. 18, 2003.

3Com User Guide—3Com IntelliJack, Model NJ220, Version 1.0, 3Com, Nov. 2003.

International Search Report for International Application No. PCT/US2005/036392, date of mailing Mar. 10, 2006.

"3Com User Guide," 3Com Network Jack, Model NJ200, Version 1.0, 3Com, Sep. 2002.

International Search Report for International Application No. PCT/US2005/036329, date of mailing Sep. 4, 2006.

International Preliminary Report on Patentability Application No. PCT/US2005/036328, date of mailing May 18, 2007.

Lynn, Kevin, "Universal Serial Bus (USB) Power Management," Wescon Conference, IEEE, Sep. 1998, pp. 194-201.

International Search Report for International Application No. PCT/US2005/036328, date of mailing Aug. 3, 2006.

Invitation to Pay Additional Fees (Partial International Search), Application No. PCT/US2005/036328, date of mailing May 26, 2006.

Mendelson Galit., White Paper "All You Need to Know About Power Over Ethernet (PoE) and the IEEE 802.3af Standard", pp. 1-24, Jun. 2004.

* cited by examiner

WIRING CLOSET REDUNDANCY

PRIORITY CLAIM

This patent is a continuation-in-part of commonly owned U.S. patent application Ser. No. 10/961,865 filed on Oct. 7, 2004 now U.S. Pat. No. 7,823,026 and entitled "Automatic System for Power and Data Redundancy in a Wired Data Telecommunications Network" in the names of inventors Roger A. Karam and Luca Cafiero, which is hereby incorporated by reference as if set forth herein.

FIELD OF THE INVENTION

The present invention relates generally to networking equipment which is powered by and/or powers other networking equipment over wired data telecommunications network connections.

BACKGROUND OF THE INVENTION

Inline Power (also known as Power over Ethernet and PoE) is a technology for providing electrical power over a wired telecommunications network from power source equipment (PSE) to a powered device (PD) over a link section. The power may be injected by an endpoint PSE at one end of the link section or by a midspan PSE along a midspan of a link section that is distinctly separate from and between the medium dependent interfaces (MDIs) to which the ends of the link section are electrically and physically coupled.

PoE is defined in the IEEE (The Institute of Electrical and Electronics Engineers, Inc.) Standard Std 802.3af-2003 published Jun. 18, 2003 and entitled "IEEE Standard for Information technology—Telecommunications and information exchange between systems—Local and metropolitan area networks—Specific requirements: Part 3 Carrier Sense Multiple Access with Collision Detection (CSMA/CD) Access Method and Physical Layer Specifications: Amendment: Data Terminal Equipment (DTE) Power via Media Dependent Interface (MDI)" (herein referred to as the "IEEE 802.3af standard"). The IEEE 802.3af standard is a globally applicable standard for combining the transmission of Ethernet packets with the transmission of DC-based power over the same set of wires in a single Ethernet cable. It is contemplated that Inline Power will power such PDs as Internet Protocol (IP) telephones, surveillance cameras, switching and hub equipment for the telecommunications network, biomedical sensor equipment used for identification purposes, other biomedical equipment, radio frequency identification (RFID) card and tag readers, security card readers, various types of sensors and data acquisition equipment, fire and life-safety equipment in buildings, and the like. The power is direct current, 48 Volt power available at a range of power levels from roughly 0.5 watt to about 15.4 watts in accordance with the standard. There are mechanisms within the IEEE 802.3af standard to allocate a requested amount of power. Other proprietary schemes also exist to provide a finer and more sophisticated allocation of power than that provided by the IEEE 802.3af standard while still providing basic compliance with the standard. As the standard evolves, additional power may also become available. Conventional 8-conductor type RG-45 connectors (male or female, as appropriate) are typically used on both ends of all Ethernet connections. They are wired as defined in the IEEE 802.3af standard.

FIGS. 1A, 1B and 1C are electrical schematic diagrams of three different variants of PoE as contemplated by the IEEE 802.3af standard. In FIG. 1A a data telecommunications network 10a comprises a switch or hub 12a with integral power sourcing equipment (PSE) 14a. Power from the PSE 14a is injected on the two data carrying Ethernet twisted pairs 16aa and 16ab via center-tapped transformers 18aa and 18ab. Non-data carrying Ethernet twisted pairs 16ac and 16ad are unused in this variant. The power from data carrying Ethernet twisted pairs 16aa and 16ab is conducted from center-tapped transformers 20aa and 20ab to powered device (PD) 22a for use thereby as shown. In FIG. 1B a data telecommunications network 10b comprises a switch or hub 12b with integral power sourcing equipment (PSE) 14b. Power from the PSE 14b is injected on the two non-data carrying Ethernet twisted pairs 16bc and 16bd. Data carrying Ethernet twisted pairs 16ba and 16bb are unused in this variant for power transfer. The power from non-data carrying Ethernet twisted pairs 16bc and 16bd is conducted to powered device (PD) 22b for use thereby as shown. In FIG. 1C a data telecommunications network 10c comprises a switch or hub 12c without integral power sourcing equipment (PSE). Midspan power insertion equipment 24 simply passes the data signals on the two data carrying Ethernet twisted pairs 16ca-1 and 16cb-1 to corresponding data carrying Ethernet twisted pairs 16ca-2 and 16cb-2. Power from the PSE 14c located in the midspan power insertion equipment 24 is injected on the two non-data carrying Ethernet twisted pairs 16cc-2 and 16cd-2 as shown. The power from non-data carrying Ethernet twisted pairs 16cc-2 and 16cd-2 is conducted to powered device (PD) 22c for use thereby as shown. Note that powered end stations 26a, 26b and 26c are all the same so that they can achieve compatibility with each of the variants described above.

Turning now to FIGS. 1D and 1E, electrical schematic diagrams illustrate variants of the IEEE 802.3af standard in which 1000 BaseT communication is enabled over a four pair Ethernet cable. Inline Power may be supplied over two pair or four pair. In FIG. 1D the PD accepts power from a pair of diode bridge circuits such as full wave diode bridge rectifier type circuits well known to those of ordinary skill in the art. Power may come from either one or both of the diode bridge circuits, depending upon whether Inline Power is delivered over Pair 1-2, Pair 3-4 or Pair 1-2+Pair 3-4. In the circuit shown in FIG. 1E a PD associated with Pair 1-2 is powered by Inline Power over Pair 1-2 and a PD associated with Pair 3-4 is similarly powered. The approach used will depend upon the PD to be powered.

Inline Power is also available through techniques that are non-IEEE 802.3 standard compliant as is well known to those of ordinary skill in the art.

In order to provide regular Inline Power to a PD from a PSE it is a general requirement that two processes first be accomplished. First, a "discovery" process must be accomplished to verify that the candidate PD is, in fact, adapted to receive Inline Power. Second, a "classification" process must be accomplished to determine an amount of Inline Power to allocate to the PD, the PSE having a finite amount of Inline Power resources available for allocation to coupled PDs.

The discovery process looks for an "identity network" at the PD. The identity network is one or more electrical components which respond in certain predetermined ways when probed by a signal from the PSE. One of the simplest identity networks is a resistor coupled across the two pairs of common mode power/data conductors. The IEEE 802.3af standard calls for a 25,000 ohm resistor to be presented for discovery by the PD. The resistor may be present at all times or it may be switched into the circuit during the discovery process in response to discovery signals from the PSE.

The PSE applies some Inline Power (not "regular" Inline Power, i.e., reduced voltage and limited current) as the discovery signal to measure resistance across the two pairs of conductors to determine if the 25,000 ohm resistance is present. This is typically implemented as a first voltage for a first period of time and a second voltage for a second period of time, both voltages exceeding a maximum idle voltage (0-5 VDC in accordance with the IEEE 802.3af standard) which may be present on the pair of conductors during an "idle" time while regular Inline Power is not provided. The discovery signals do not enter a classification voltage range (typically about 15-20V in accordance with the IEEE 802.3af standard) but have a voltage between that range and the idle voltage range. The return currents responsive to application of the discovery signals are measured and a resistance across the two pairs of conductors is calculated. If that resistance is the identity network resistance, then the classification process may commence, otherwise the system returns to an idle condition.

In accordance with the IEEE 802.3af standard, the classification process involves applying a voltage in a classification range to the PD. The PD may use a current source to send a predetermined classification current signal back to the PSE. This classification current signal corresponds to the "class" of the PD. In the IEEE 802.3af standard as presently constituted, the classes are as set forth in Table I:

TABLE I

| Class | PSE Classification Current Range (mA) | Corresponding Inline Power Level (W) |
| --- | --- | --- |
| 0 | 0–5 | 15.4 |
| 1 | 8–13 | 4.0 |
| 2 | 16–21 | 7.0 |
| 3 | 25–31 | 15.4 |
| 4 | 35–45 | 15.4 |

The discovery process is therefore used in order to avoid providing Inline Power (at full voltage of −48 VDC) to so-called "legacy" devices which are not particularly adapted to receive or utilize Inline Power.

The classification process is therefore used in order to manage Inline Power resources so that available power resources can be efficiently allocated and utilized.

In many cases where PDs are used, it may be desirable to provide some redundancy in terms of data and/or power delivery for cases in which equipment (hubs, switches, cable and the like) providing the power and/or data fails to continue to do so.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention described in the following detailed description are directed at power and data redundancy in a single wiring closet. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1A:
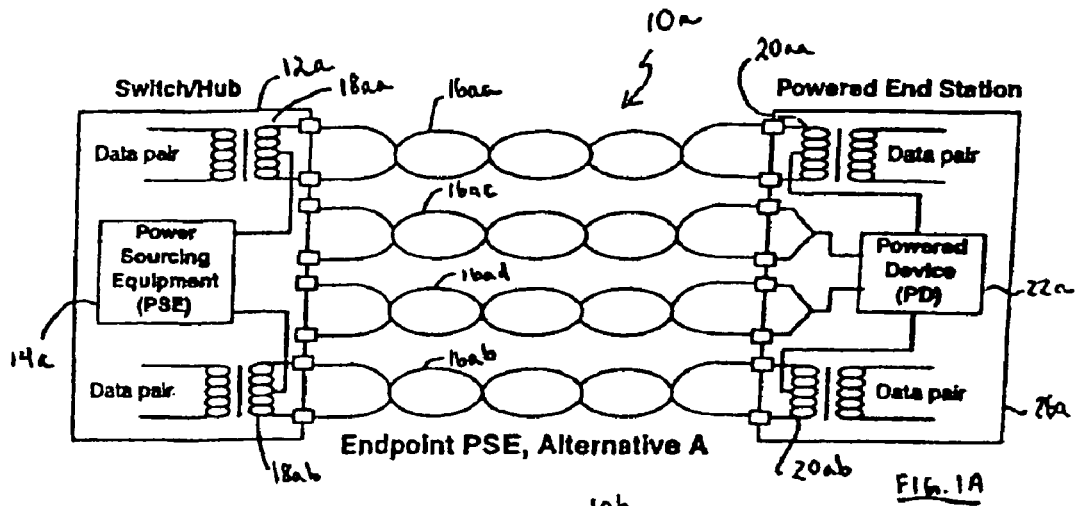
FIGS. 1A, 1B, 1C, 1D and 1E are electrical schematic diagrams of portions of data telecommunications networks in accordance with the prior art.
Figure 1B:
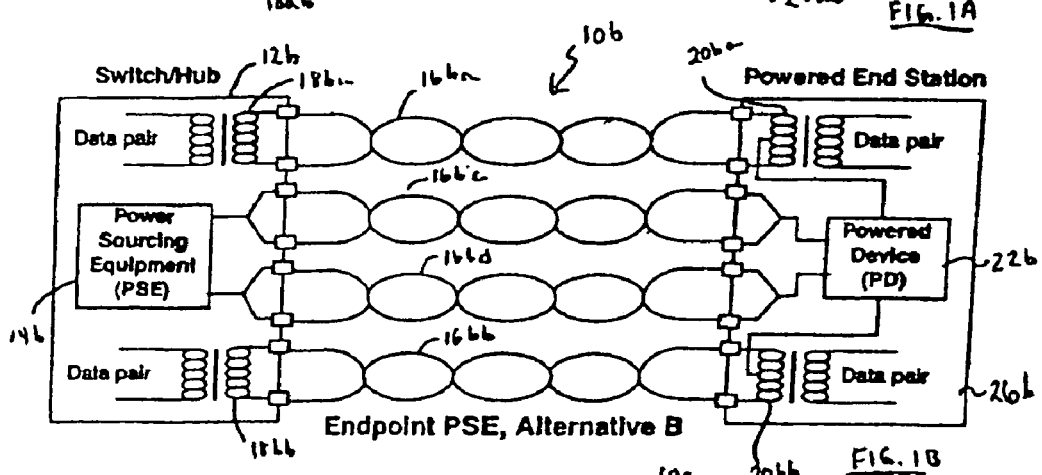
Figure 1C:
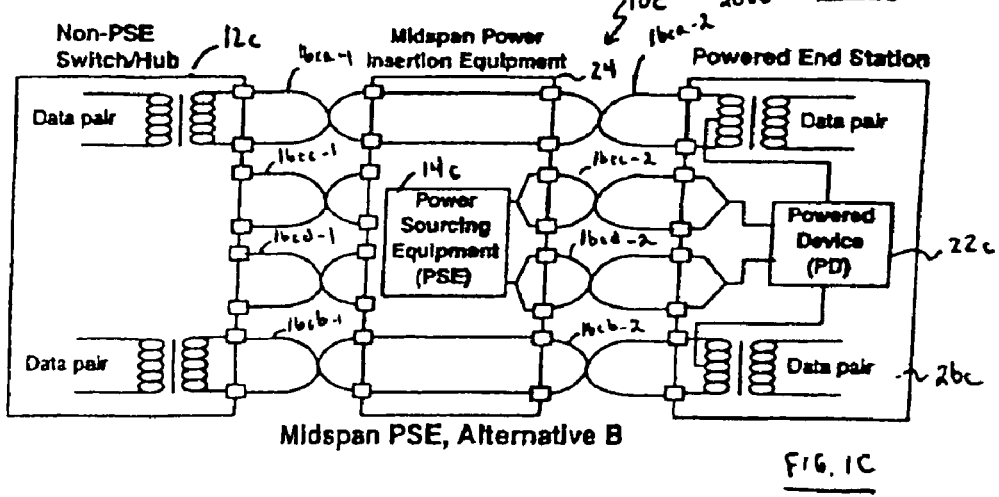
Figure 1D:
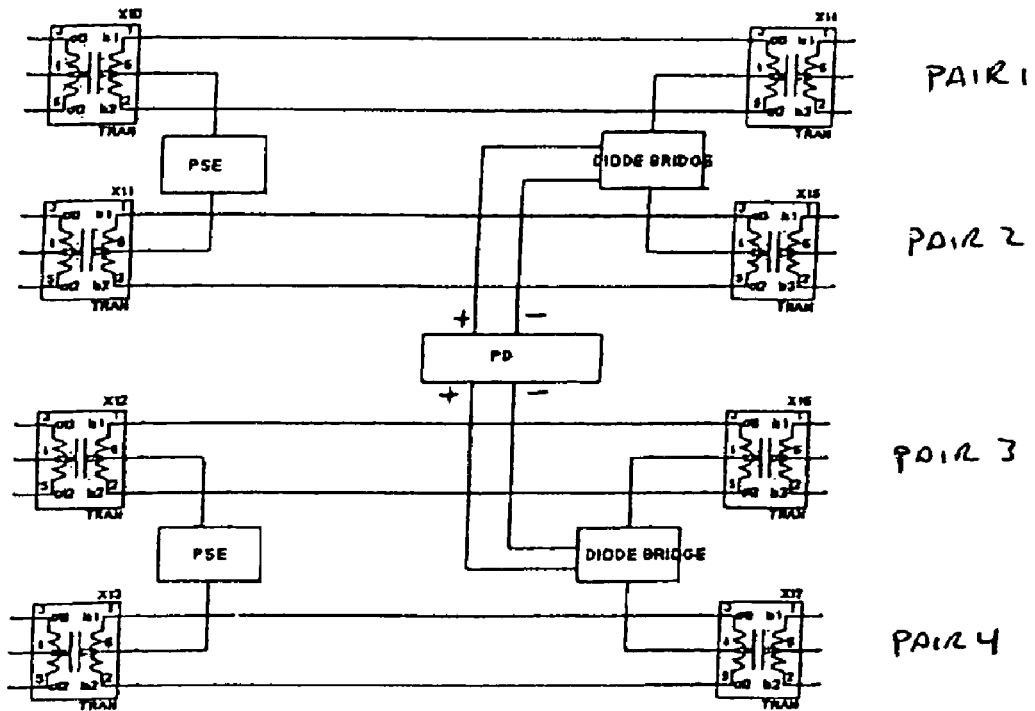
Figure 1E:
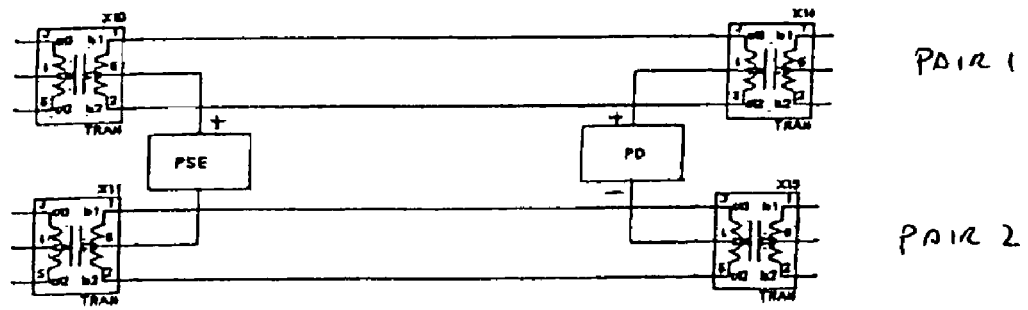
Figure 1E:
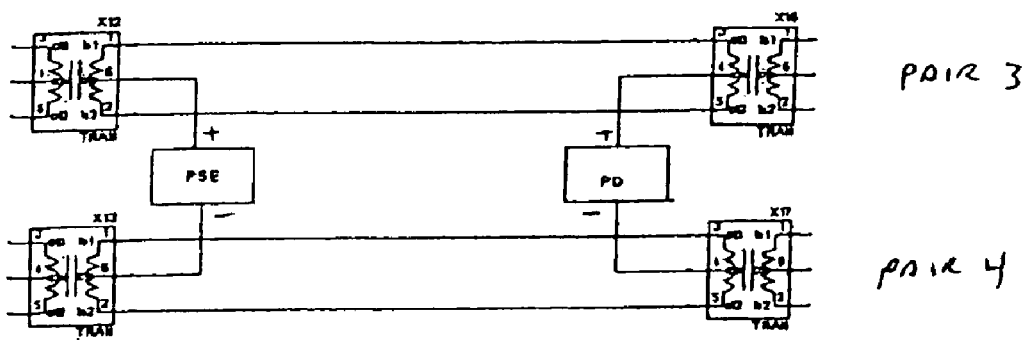
Figure 2:
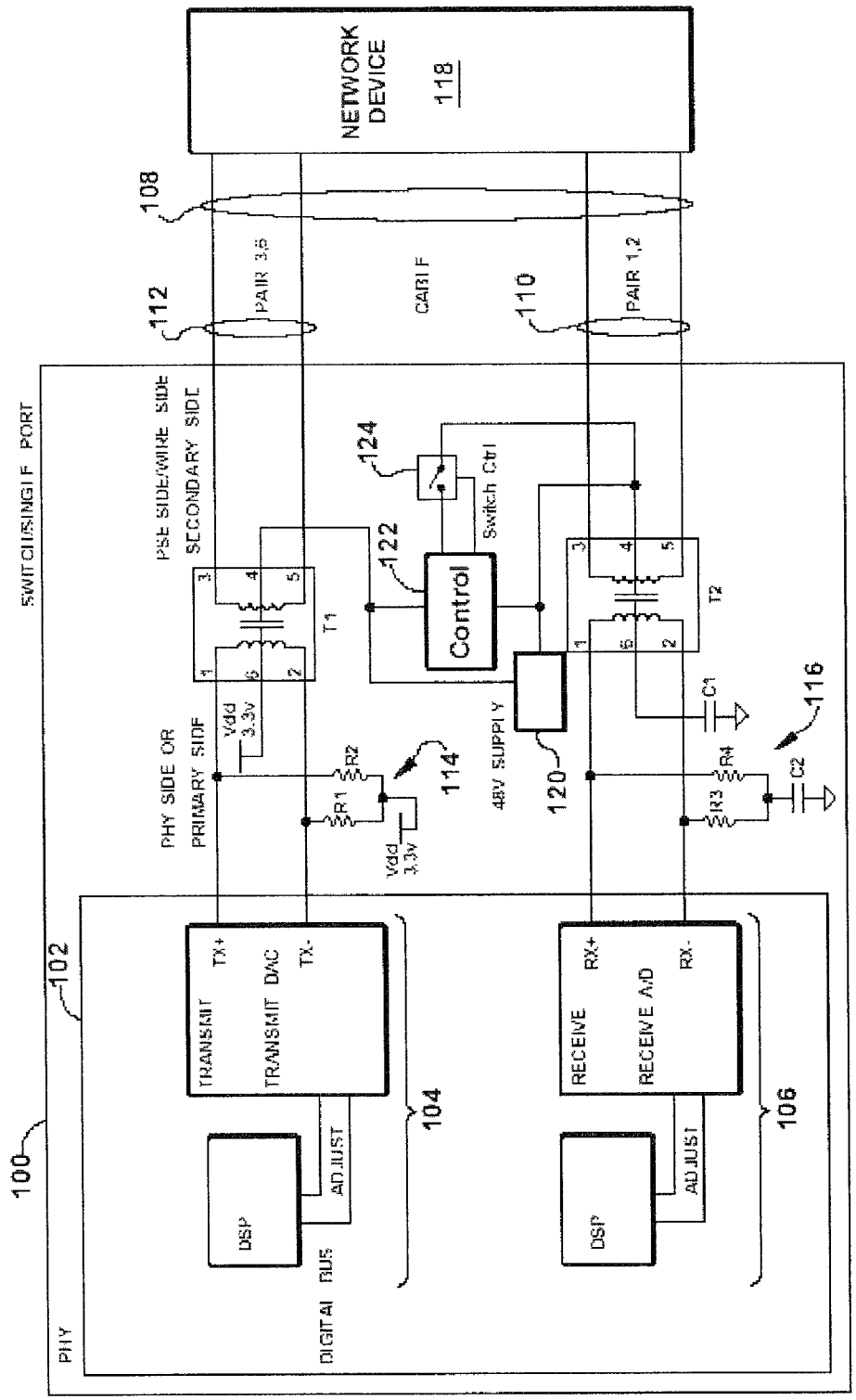
FIG. 2 is an electrical schematic diagram of a typical Ethernet 10/100 Base T connection in accordance with the prior art.

Turning now to FIG. 2 a typical 2-pair Ethernet (10 Base T, 100 Base T and 1000BT if 4-pairs were used) connection is illustrated. Box 100 encompasses the Ethernet port as it might exist in a network device such as a switch, hub, router or like device. Within port 100 is a PHY or physical layer device 102 which includes transmit circuitry 104 and receive circuitry 106. The transmit circuitry 104 interfaces to a connector such as an RJ-45 connector (not shown here) and through the connector to a cable 108 which includes at least two pairs of conductors, the Pair 1-2 (110) and the Pair 3-6 (112). The interface between the transmit circuitry 104 and the cable 108 includes a center-tapped magnetic device such as transformer T1. T1 has a PHY-side including pins 1 and 2 and center tap 6, and a wire side including pins 3 and 5 and center tap 4. The PHY side is also referred to as the primary side; the wire side is also referred to as the secondary side of the magnetic device T1. Termination circuitry 114 provides a Vdd bias (here illustrated as +3.3 VDC) to the primary of T1. The secondary of T1 is coupled to cable pair 112 which is, in turn, coupled in operation to a network device 118 which may be another hub, switch or router or a PD such as a Voice Over Internet Protocol (VOIP) telephone or other network device.

The interface between the receive circuitry 106 and the cable 108 includes a center-tapped magnetic device such as transformer T2. T2 has a PHY-side including pins 1 and 2 and center tap 6, and a wire side including pins 3 and 5 and center tap 4. The PHY side is also referred to as the primary side; the wire side is also referred to as the secondary side of the magnetic device Tb 2. Termination circuitry 116 provides a ground bias to the primary of T2. The secondary of T2 is coupled to cable pair 110 which is, in turn, coupled in operation to a network device 118. If the pairs of conductors shown belonged to a 1000 Base T wired data telecommunications network segment then each pair would transmit and receive at the same time and all four pairs in the cable would be used.

Center tap pins 4 of T1 and T2 are coupled to inline power circuitry including a 48 VDC power supply 120 for providing Inline Power over cable 108, control circuitry 122 and switch circuitry 124.

Figure 3:
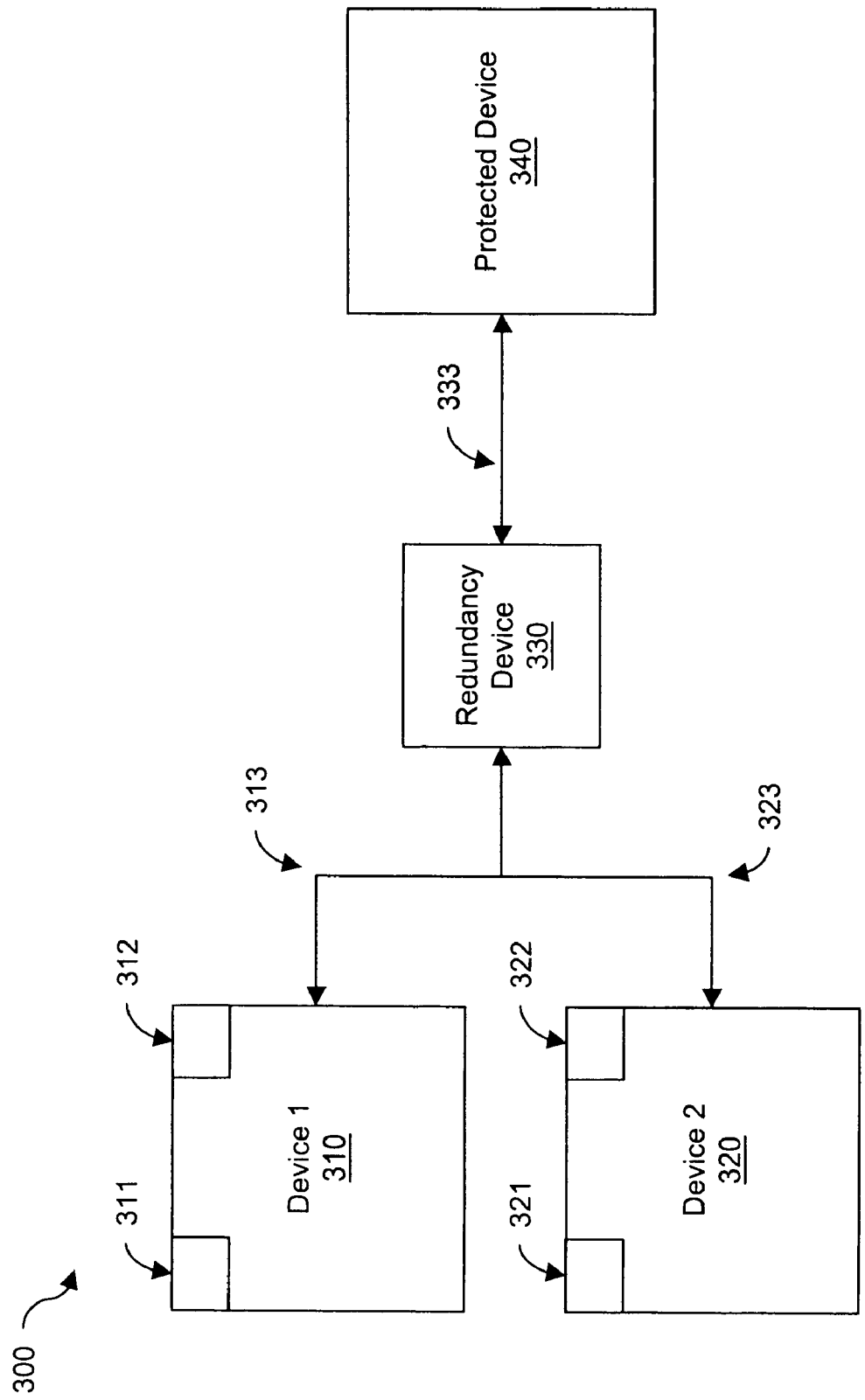
FIG. 3 is a block diagram of a system in which redundancy of data and/or power is provided to a PD.

FIG. 3 is a block diagram of a system 300 in which redundancy of data and/or power is provided to a PD. In the system 300 it is desired to provide the protected device 340 with redundancy in both power and/or data from a pair of devices labeled Device 1 (310) and Device 2 (320) which serve as relay uplink sources of data and/or power for the protected device 340. As used herein, the protected device may be referred to also as a powered device (PD) as defined in IEEE 802.3af. Because the PD is being redundantly protected with either or both of power and/or data, the device being hosted by the disclosed system will be referred to herein as a protected device.

It is contemplated that the relay uplinks may comprise an Ethernet switch such as a line card or other wiring closet switch device configured in accordance with the teachings of this disclosure. It is to be understood that devices 1 and 2 may comprise any device from which Ethernet data and/or power may be obtained. The devices are coupled to a redundancy device 330 through respective Ethernet cable links 313 and 323. To execute various embodiments of this disclosure, the switches 310 and 320 may include a microprocessor 311 and 321, and associated memory 312 and 322, respectively. While two such devices are shown in FIG. 3, it is to be understood that any number of switches may be employed in the present disclosure.

FIG. 3 also includes a protected device 330 representing a host device to which it is desired to provide power and/or data. It is contemplated that the protected device may comprise any device that will accept power and/or data over the physical Ethernet link 333, such as a VoIP telephone or Ethernet switch.

FIG. 3 includes a redundancy device 330 provided to couple the protected device 340 to the relay uplink devices 310 and 320 through an Ethernet link 333. As will be more fully described below, the redundancy device 330 is configured to accept one of the devices as the active device, and pass data and/or power from the active device to the protected device. Other relay uplinks are held in an inactive state. The relay uplink devices are configured to communicate with each other through the redundancy device and monitor each other's status, and detect when there is a failure. When a failure is detected, the inactive device will send a switchover command to the redundancy device, thereby becoming the active device and transparently provide a redundant source for data and/or power to the protected device.

The redundancy device thereby functions as a three-port relay configured to provide a fail-safe backup source by accepting power and/or data from at least two relay uplinks through Ethernet physical cables, and seamlessly switch between the two uplinks when a failure is detected. The redundancy device of this disclosure is also configured to enable the relay uplinks of the disclosure to communicate with each other and establish a redundant system. Methods for providing redundancy will now be disclosed.

Figure 4A:
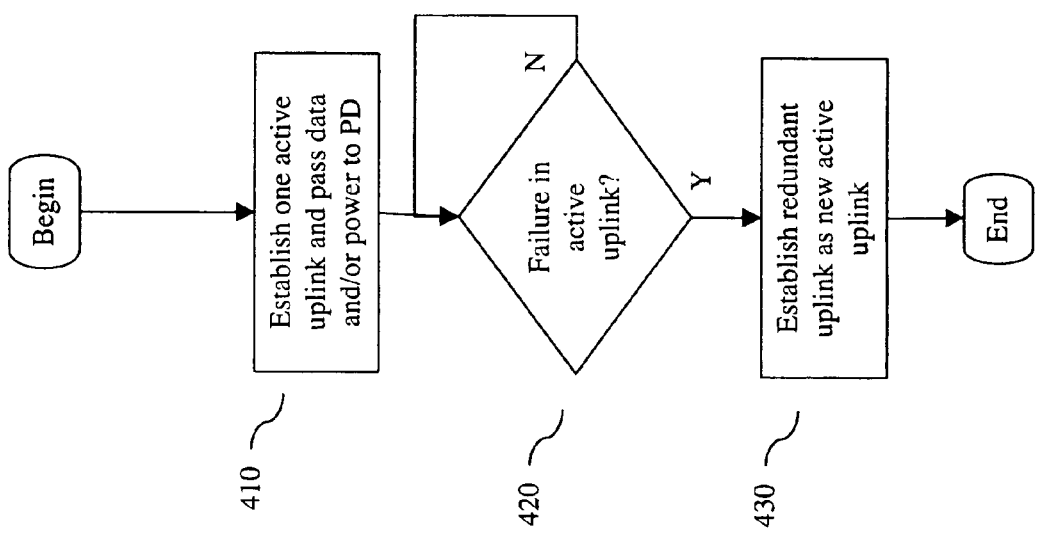
FIGS. 4A and 4B are flow diagrams of a method for providing redundancy of power and/or data to a protected device in accordance with the teachings of this disclosure

FIG. 4A is a flow diagram of a method for providing redundancy of power and/or data to a protected device in accordance with the teachings of this disclosure. In act 410, the redundancy device then establishes one of the uplinks as the active state uplink, and passes data and/or power from active uplink to the protected device. The balance of the relay uplinks may be maintained in a redundant inactive state.

In a preferred embodiment, relay uplinks may be provided in redundant pairs, with a particular port of the redundancy device port pairs designated as the default active uplink, and the other port of the pair as the redundant port. It is to be understood that any number of relay uplinks may be employed.

In query 420, the active relay uplink is monitored to detect a failure in either power and/or data. If a failure is detected, then in act 430 a switchover process is activated whereby the failed active relay uplink is taken off-line, and a redundant relay uplink is replaced as the active relay uplink, thereby supplying the PD with a redundant source of power and/or data.

As will be appreciated, a potential dual source of power exists from each of 310 and 320 and may be delivered to a PD at all times over each set of pairs in the twisted pair cable creating two sources of input power at 340 each from a different devices/sources relieving the need to worry about dual sources of power or power redundancy.

Figure 4B:
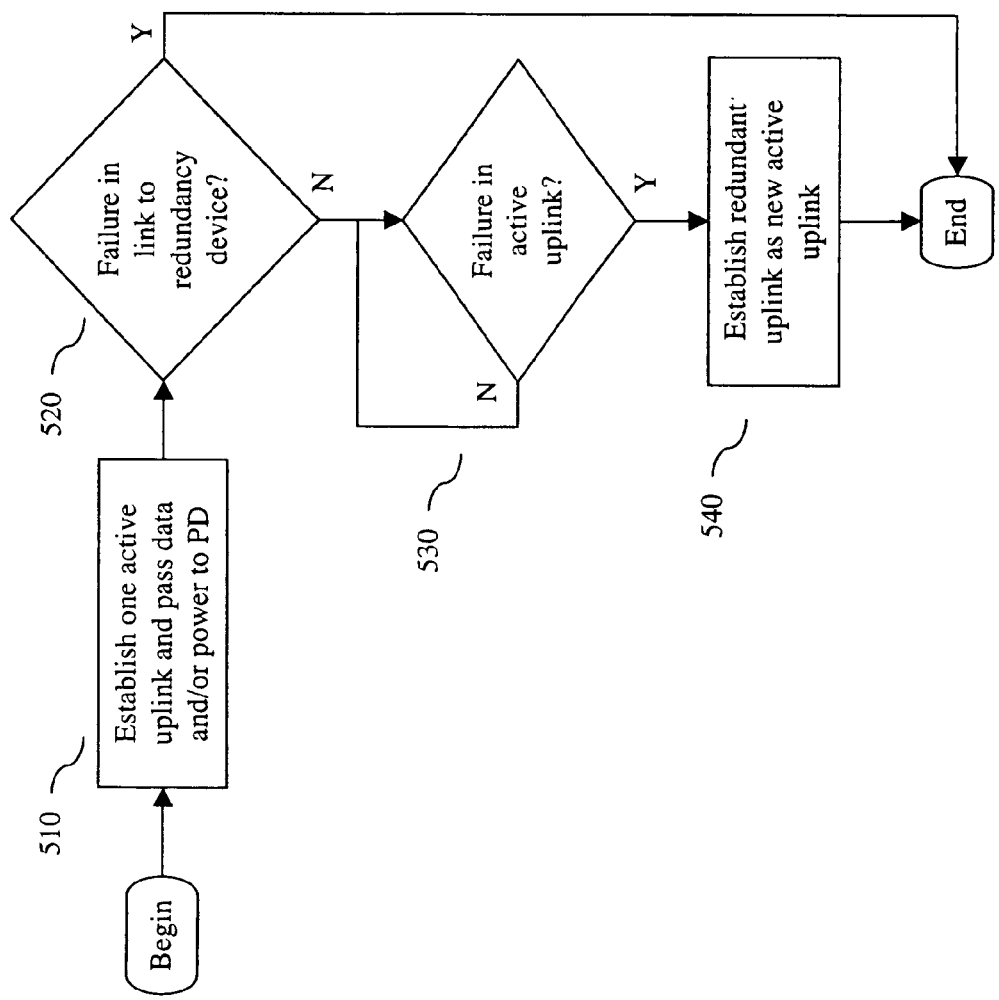

FIG. 4B is a flow diagram of a further method for providing redundancy of power and/or data to a protected device in accordance with the teachings of this disclosure. In FIG. 4B, the process begins in act 510, where one of the uplink relays is established as the active uplink, and data and/or power is provided to a PD through the redundancy device.

In query 520, the inactive redundant device determines whether its' link to the redundancy device is up and functioning. If it is determined that its link is down, the process ends.

If it is determined that its link is up, then the process moves to query 530, where it is determined whether the link associated with the active uplink relay is up and functional. If a failure is found in the active uplink, the process moves to act 540, where a switchover command is issued to the redundancy device, and power and/or data is supplied from the device that issued the switchover command.

While the process in FIG. 4B is shown as being sequential, it is to be understood that the actions performed in queries 520 and 530 may be performed in a parallel fashion as will be explained below.

As will be more fully described below, the relay uplinks that are maintained in an inactive state are configured to detect a failure of the active relay uplink, and indicate to the redundancy device that a switchover is needed. The redundancy device monitors communications from the inactive device to detect a switchover command. Responsive to a switchover communication from a redundant uplink, the redundancy device will establish the redundant uplink from which the switchover command was received as the new active uplink, and begin passing data and/or power from newly established active uplink to the protected device.

Figure 5:
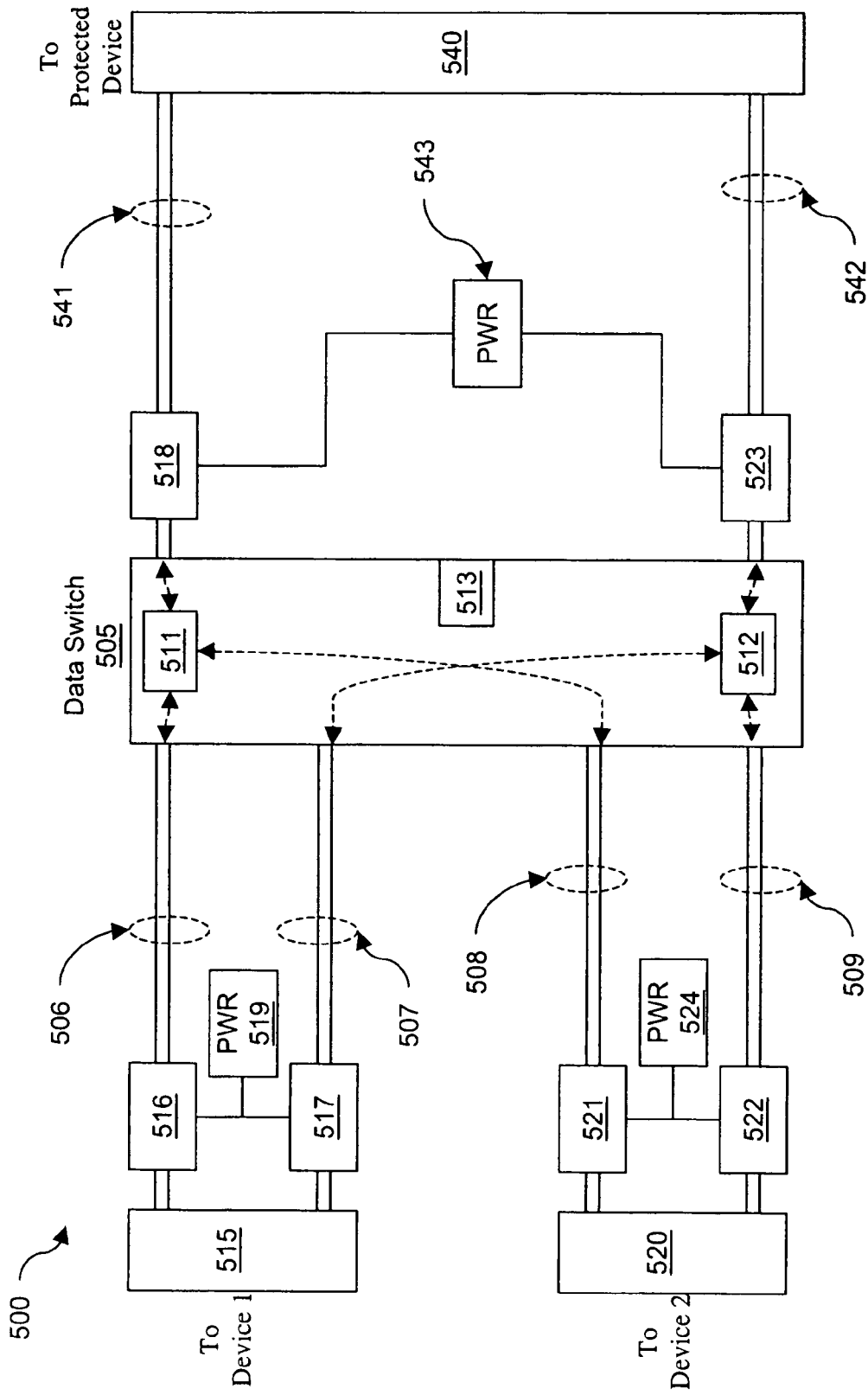
FIG. 5 is a conceptual block diagram of a redundancy device 500 configured in accordance with the teachings of this disclosure.

FIG. 5 is a conceptual block diagram of a redundancy device 500 configured in accordance with the teachings of this disclosure.

The redundancy device 500 includes a data switch 505 configured as will be more fully disclosed below. Data and/or power is received from uplink relays via Ethernet connectors 515 and 520. The received signals on connector 515 are coupled to switch 505 through twisted pairs 506 and 507 and may be interfaced through termination circuitry modules 516 and 517 that may include conventional circuitry as discussed above. Likewise, signals received on connector 520 are coupled to switch 505 through twisted pairs 508 and 509 which may be interfaced through circuitry 521 and 522. Inline power may also be provided to through power sources 519 and 524.

In operation, connector 515 is coupled to a first source of data and/or power, and connector 520 is connected to a second such source. Typically, the sources are upstream uplink relays as described above. The data switch 505 includes switching circuitry 511 coupled to twisted pairs 506 and 508, and is configured to direct the data and/or power on either twisted pairs 506 and 508 onto twisted pair 541. Likewise, switching circuitry 512 is coupled to twisted pairs 507 and 509, and is configured to present the power and/or data on twisted pairs 507 and 509 onto twisted pair 542. It is contemplated that switching circuitry 511 and 512 may be under the control of control circuitry 513. The data switch and associated control circuitry may be embodied as system of relays, as an integrated circuit such as an ASIC as is known in the art, or as a microprocessor-based system.

Differential pairs 541 and 542 are in turn coupled to connector 540 through termination circuitry 518 and 523, respectively. Inline power is supplied to differential pairs 541 and 542 through power source 543. Connector 540 is coupled to the protected device via an external twisted pair cable such as CAT 3, CAT 5 and the like; connectors 515, 520 and 540 may be RJ45 connectors or similar.

It is contemplated that the redundancy device and uplink relays may be configured to communicate with each other to effect the redundancy functionality of this disclosure. In one embodiment, packet-based communication is utilized to effect the data and/or power redundancy in accordance with the teachings of this disclosure. The packets may be generated by the relay uplinks and are decoded by the redundancy device. Packets are provided that are configured to indicate to the relay which relay uplink is the active uplink, and when to switchover to a redundant source.

In one preferred embodiment, the various components of the redundant system may be configured to communicate using a protocol known as Bi-Directional Forwarding Direction, referred to herein as BFD.

BFD is a simple hello protocol that in many respects is similar to the detection components of well-known routing protocols in the art. A pair of systems, such as the redundant pair of uplinks of this disclosure, transmit BFD packets periodically over each path between the two systems, and if a system stops receiving BFD packets for long enough, some component in that particular bidirectional path to the neighboring system is assumed to have failed. Though the following embodiment utilizes the BFD protocol, it is to be understood that any similar hello protocol may be utilized in the present invention.

For example, the present disclosure may also utilize y.17oam that is currently being defined by the ITU-T. Also, IEEE 802.1ag (also being defined) may be utilized. Both of these are Ethernet OAM standards currently in progress, and may be employed as hello protocols herein.

A path is only declared to be operational when two-way communication has been established between systems. A separate BFD session is created for each communications path and data protocol in use between two systems. Each system estimates how quickly it can send and receive BFD packets in order to come to an agreement with its neighbor about how rapidly detection of failure will take place. These estimates can be modified in real time in order to adapt to unusual situations. This design also allows for fast systems on a shared medium with a slow system to be able to more rapidly detect failures between the fast systems while allowing the slow system to participate to the best of its ability.

BFD Control packets are sent in an encapsulation appropriate to the environment, such as within the Ethernet environment of this disclosure. BFD has two operating modes which may be selected, as well as an additional function that can be used in combination with the two modes. The primary mode is known as Asynchronous mode. In this mode, the systems periodically send BFD Control packets to one another, and if a number of those packets in a row are not received by the other system, the session is declared to be down.

The second mode is known as Demand mode. In this mode, it is assumed that each system has an independent way of verifying that it has connectivity to the other system, so once a BFD session is established, the systems stop sending BFD Control packets, except when either system feels the need to verify connectivity explicitly, in which case a short sequence of BFD Control packets is sent, and then the protocol quiesces.

An adjunct to both modes is the Echo function. When the Echo function is active, a stream of BFD Echo packets is transmitted in such a way as to have the other system loop them back through its forwarding path. If a number of packets in a row of the echoed data stream are not received, the session is declared to be down. The Echo function may be used with either Asynchronous or Demand modes.

The payload of a BFD Echo packet is considered to be a local matter, since only the sending system ever processes the content. The only requirement is that sufficient information is included to demultiplex the received packet to the correct BFD session after it is looped back to the sender.

In addition to the BFD protocol, it is contemplated that the connectivity check packets may include information enabling the redundancy device to operate in accordance with this disclosure. In one embodiment, the packets are modified by the sending device to indicate three operations to the redundancy device.

To accomplish this special packet communication, it is contemplated that the packets may be modified by the relay uplinks by replacing the destination MAC address with one of three special MAC addresses. As is known by those of ordinary skill in the art, typically certain address ranges are reserved, such as multicast addresses.

These addresses may be hardcoded in a lookup table in the redundancy device. It is contemplated that the table may contain instructions regarding a specified operation to be performed corresponding to an address contained in the destination address of a received packets. The switching and control circuitry of the redundancy device may be configured to perform a lookup operation and execute a fetched operation corresponding with a decoded address in the table. Thus, responsive to the received MAC address, the redundancy device may route packets between devices, or switch data and/or traffic flow between the active device and redundancy device in the event of a failure.

In one preferred embodiment, three special addresses are provided corresponding to three desired operations. A first address indicates to the redundancy device that the packet is a loopback packet. This packet indicates to the redundancy device that this packet should be echoed back out the uplink on which it was received. This packet may be utilized by the uplink to check the integrity of its' link to the redundancy device.

A second address represents a connectivity check packet that indicates to the redundancy device to re-transmit the packet out to a different uplink, i.e., out an uplink on which the packet didn't arrive such as to the redundant pair device.

The BFD protocol described above may be employed to determine if there is a failure on the link. Hence, a failure to receive a certain amount of connectivity check packets in a given time may indicate to the sender that the device path associated with the redundant pair device has failed.

If a failure has been detected, then the relay uplink may send a packet having a third address embedded therein as a switchover packet to the redundancy device. The switchover packet indicates to the redundancy device to switch over passing data and/or power to the uplink on which the switchover packet was received to the PD. After performing a switchover, the switchover packet may be retransmitted out the uplink on which was received to indicate to the sender that the switchover packet was received and processed.

The speed of the switchover process is dependent on the speed of the loopback and switchover packet transmission process. As mentioned above, system using BFD may estimate roundtrip path times to establish how quickly failures will be declared. Hence, it is contemplated that by employing redundancy devices near wiring closets, the failure detection and switchover process of this disclosure may be accomplished in a manner fast enough so as to be transparent to the protected device.

FIGS. 6A-6G are block diagrams of a redundancy system operating in accordance with the teachings of this disclosure, illustrating the packet-based failure detection and switchover process. FIGS. 6A-6G show two devices, labeled devices 1 and 2, coupled to a redundancy device. A protected device is coupled to the redundancy device. FIGS. 6A-6G show the simplest implementation whereby a redundant pair of devices is provided to effect the redundancy benefits of this disclosure.

Figure 6A:
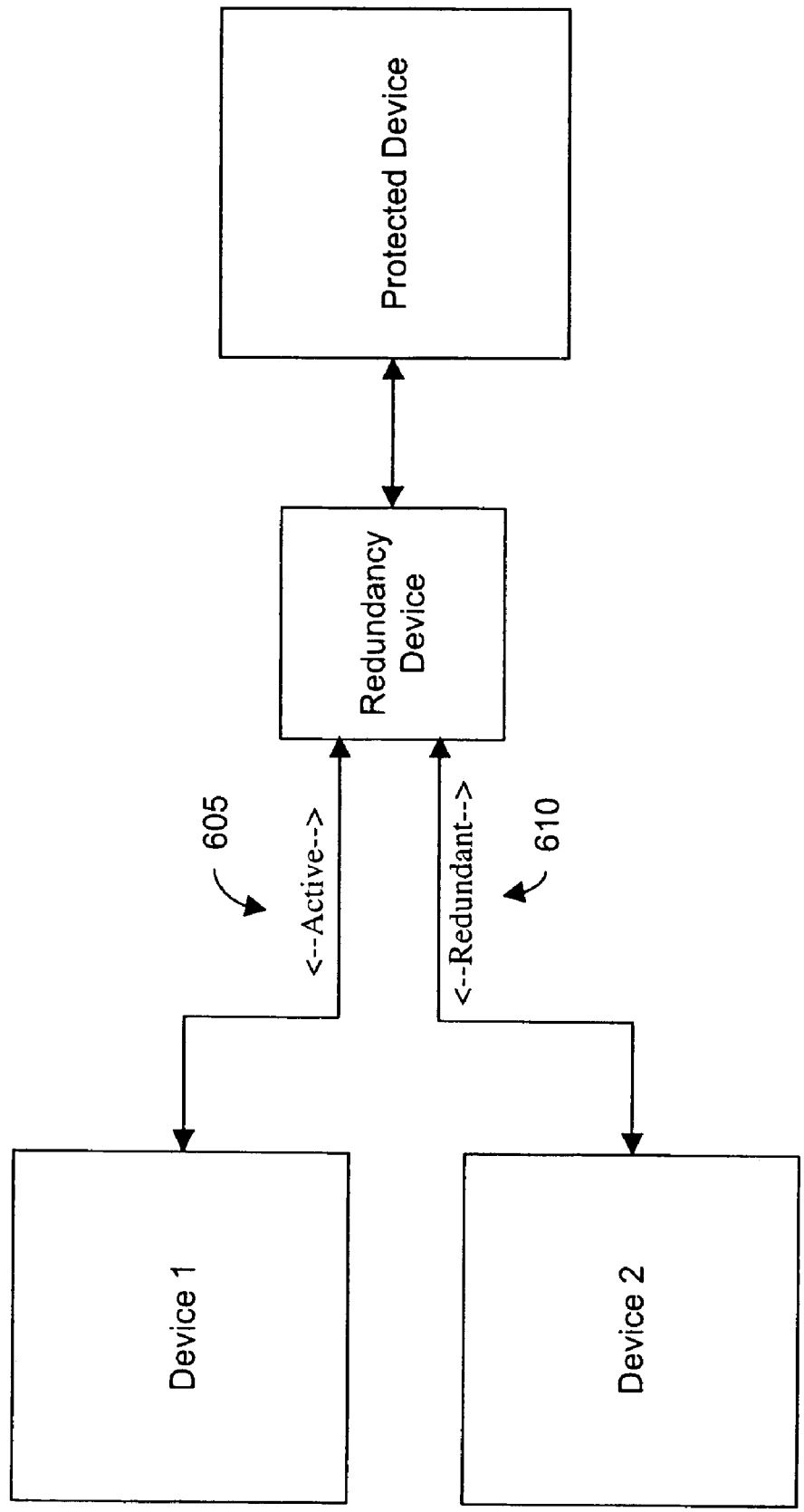
FIG. 6A-6G are block diagrams of a redundancy system operating in accordance with the teachings of this disclosure.

FIG. 6A shows the system at startup. As mentioned above, it is contemplated that at startup, a port may be designated to corresponding to the default active device.

Alternatively, it is contemplated that a discovery protocol may be employed to establish an active device. For example, at startup, each device may advertise their redundant capabilities through a discovery protocol such as the Cisco Discovery Protocol (CDP) provided by the assignee of the present disclosure, though any similar protocol may be employed.

Figure 6B:
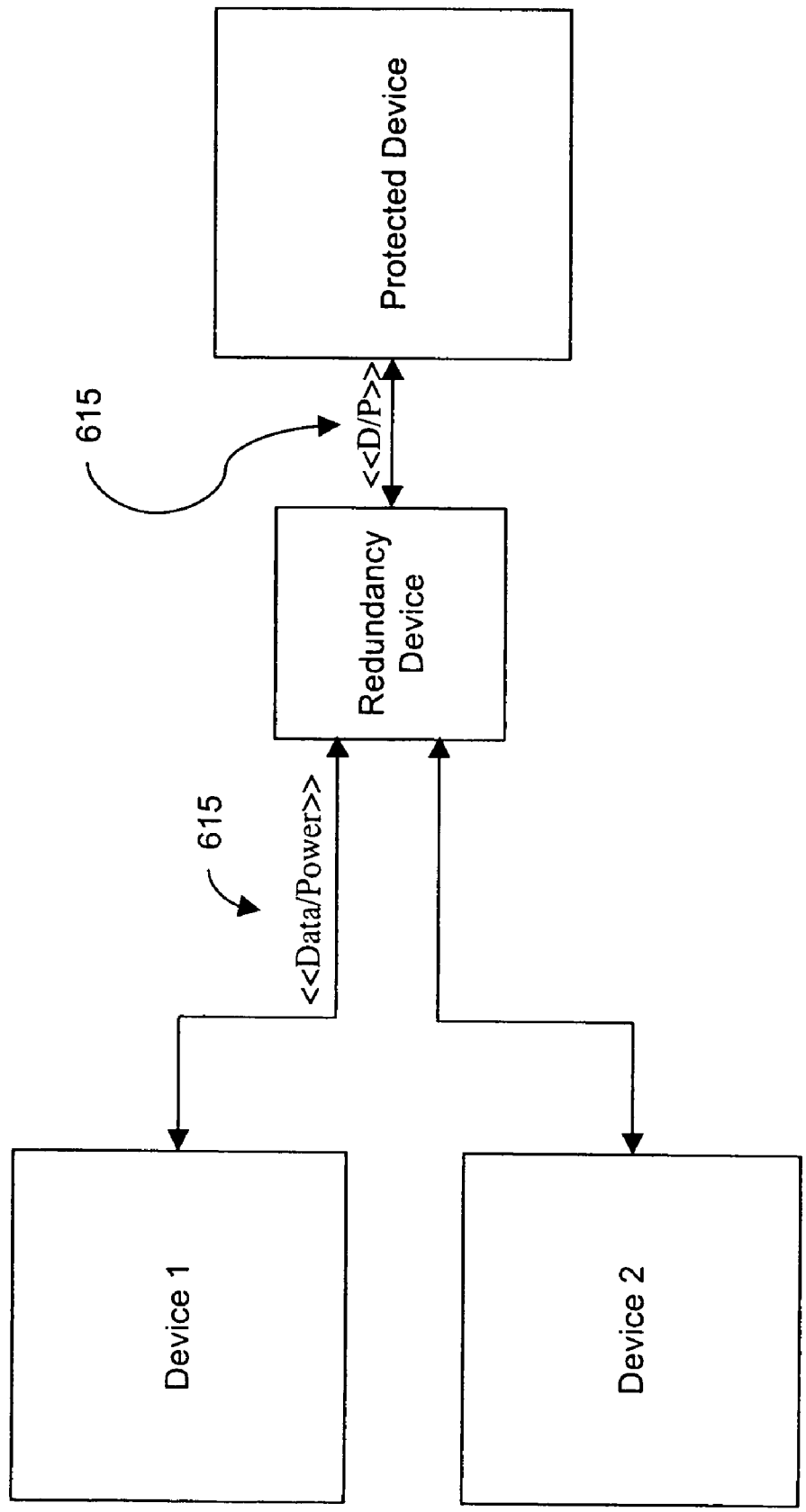

FIG. 6A shows an active path 605 and a redundant path 610 being established as a result of the startup process, and FIG. 6B shows data and/or power 615 flowing between the active Device 1 and the protected device.

Figure 6C:
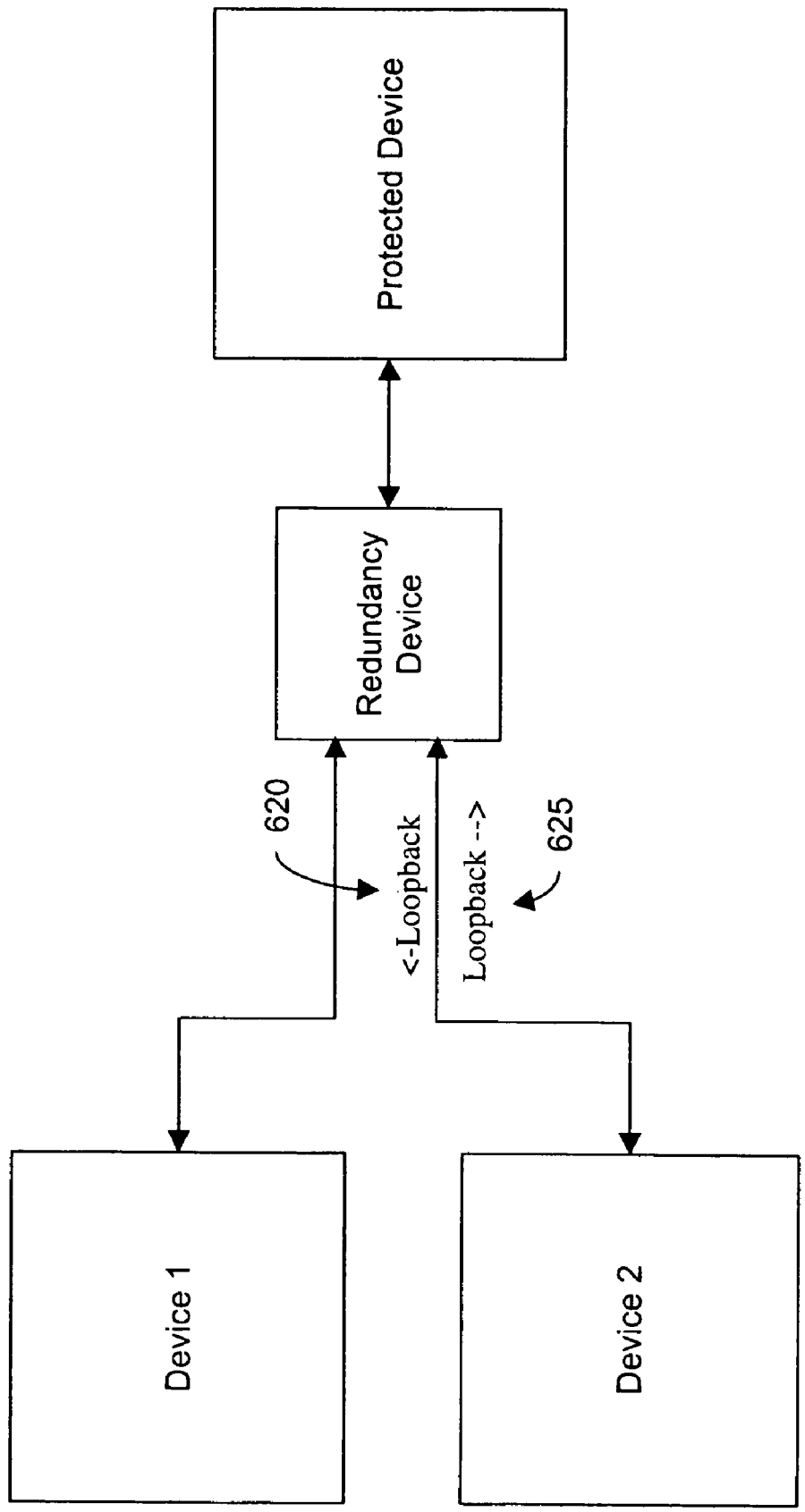

FIG. 6C shows Device 2 sending a loopback packet 620 to the redundancy device. As mentioned above, this packet may have an indication embedded therein that indicates to the redundancy device to send the packet back out the uplink on which it was received. FIG. 6C therefore shows the redundancy device as returning the packet as loopback packet 625 to Device 2.

Figure 6D:
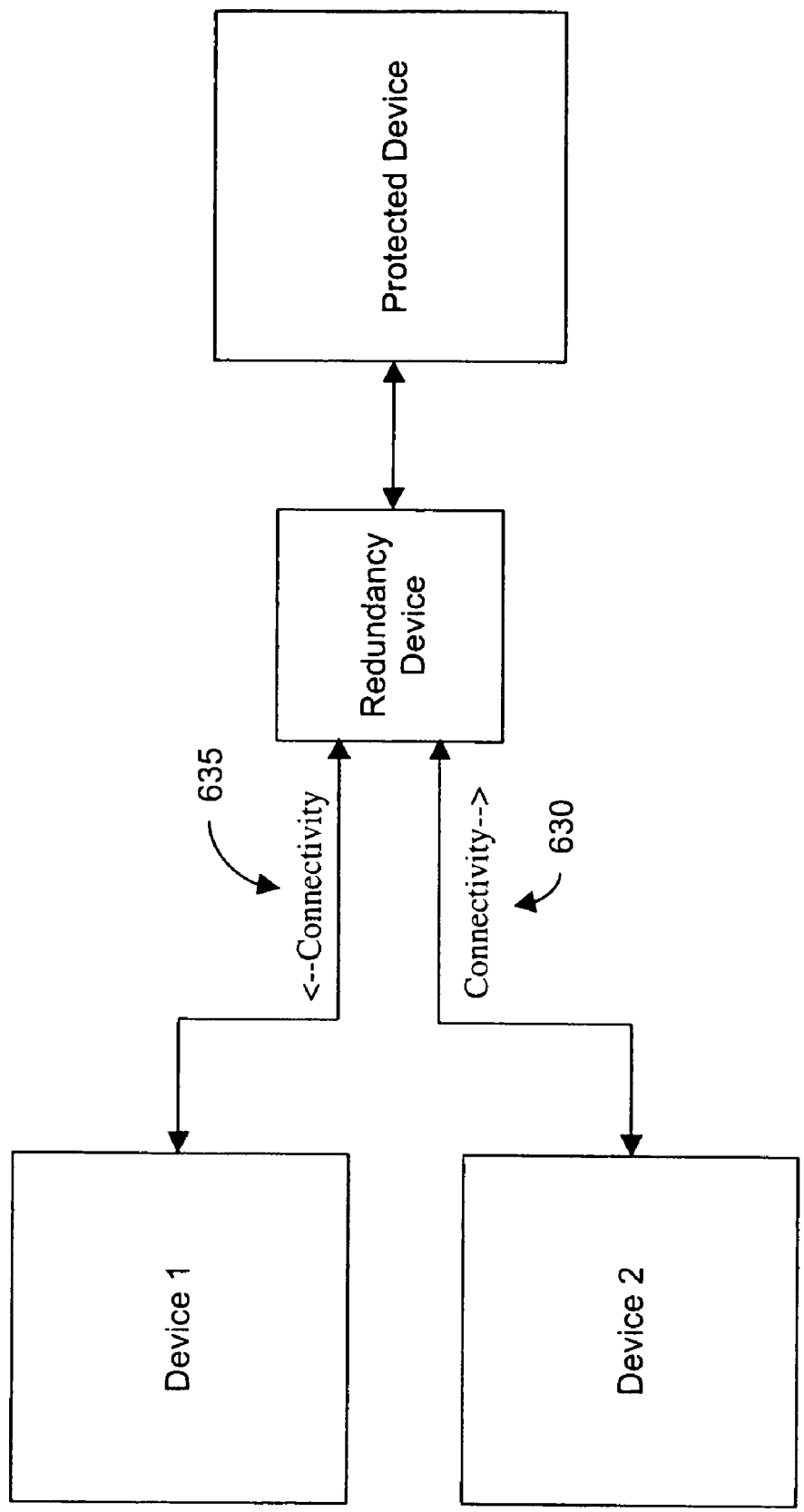

FIG. 6D shows Device 2 sending a connectivity check packet 630 to the redundancy device. As mentioned above, this packet may have an indication embedded therein that indicates to the redundancy device to send the packet back out the other uplink, i.e., the uplink other than from which it was received. In a system where a pair of redundancy devices are provided as illustrated in FIGS. 6A-6G, the connectivity check packet indicates to the redundancy device to transmit the packet to the redundant device partner, i.e., to the other device pair. Accordingly, FIG. 6D shows the redundancy device sending connectivity check packet 635 being forwarded to Device 1.

Figure 6E:
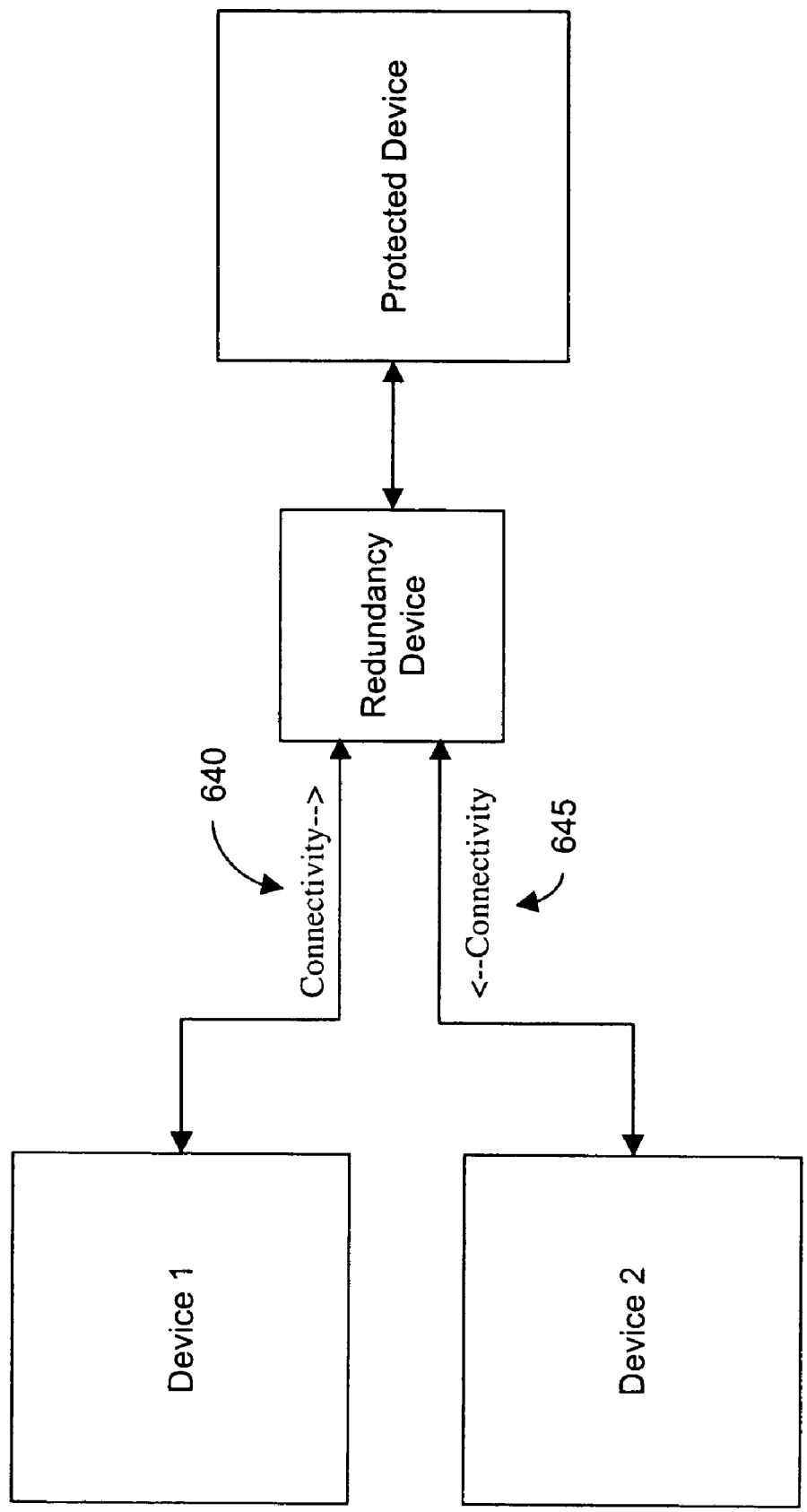

FIG. 6E shows a connectivity check packet being generated by Device 1 as packet 640 in accordance with the BFD process described above. The redundancy device then forwards the packet on to Device 2 as packet 645.

As mentioned above, the disclosed connectivity check packets may be generated in a periodic fashion as determined by the BFD protocol. Hence, in a typical steady state scenario, each of the redundant pair of devices will periodically send out both loopback packets and connectivity check packets, wherein the loopback packets contain an indication for the redundancy device to echo the packet back to the sender, and wherein the connectivity check packet contains an indication for the redundancy device to transmit the packet to the other device of the redundant pair.

In accordance with the BFD protocol, each of the devices expects to receive a certain number of connectivity check packets from the other device in a pre-defined time period, in addition to receiving its own loopback packets. Using these packets, the inactive device may detect a failure in the active device.

A failure requiring a switchover may be detected by 1) first verifying that its own link to the redundancy device is operative, and then 2) determining that the other device or device's link has failed.

To determine the first condition, the device need only receive its own loopback packets back from the redundancy device to verify that its link is operational. To establish the second condition, the device may detect a failure of the other paired device by failing to receive a certain number of connectivity check packets in a row.

In operation as a redundant pair, it is contemplated that the switchover condition may be detected when the inactive switch (Device 2) can verify that its link to the redundancy device is operational, and it fails to receive a prescribed number of connectivity check packets from the active relay switch (Device 1) in a given time.

Figure 6F:
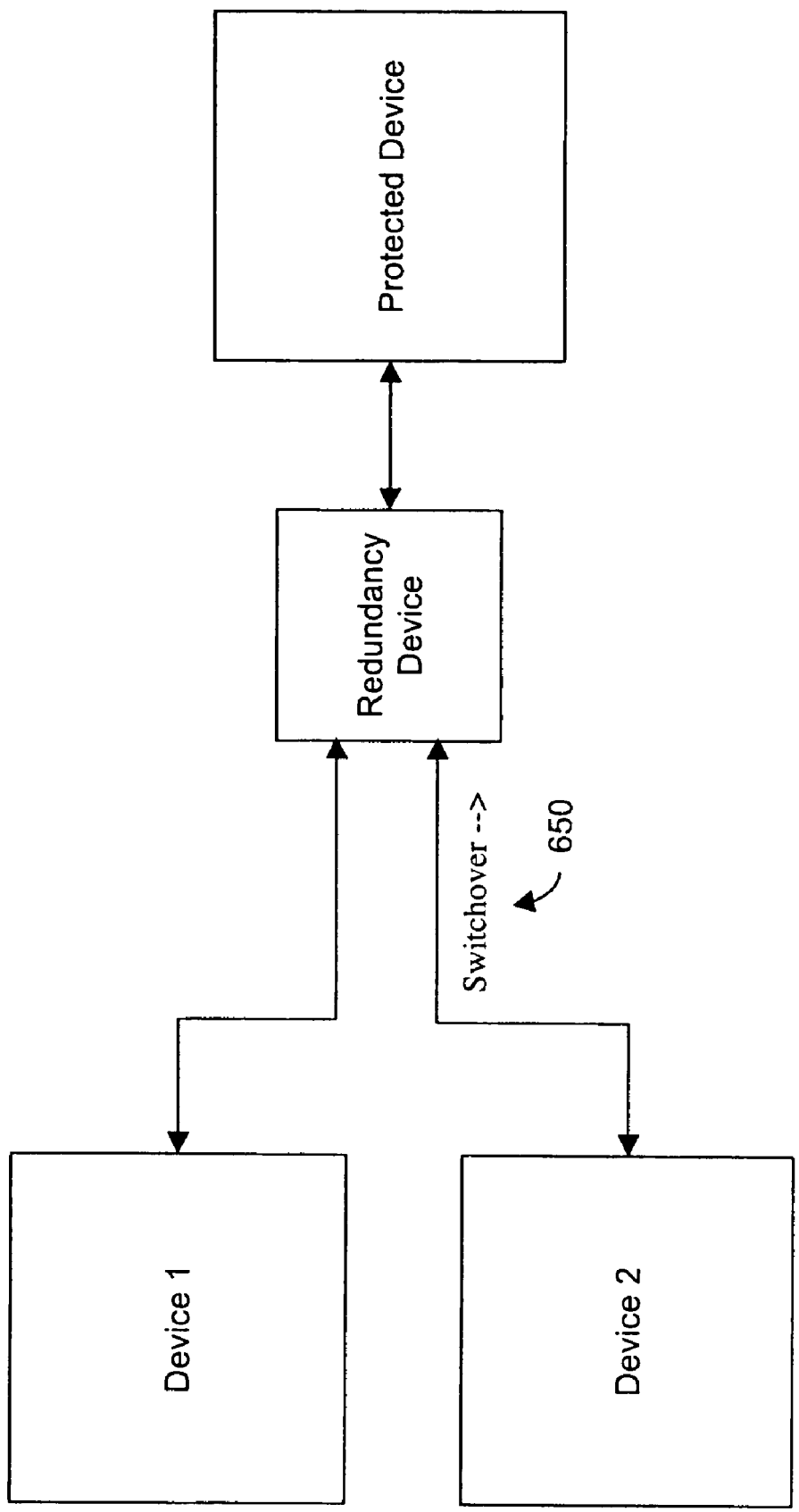
Figure 6G:
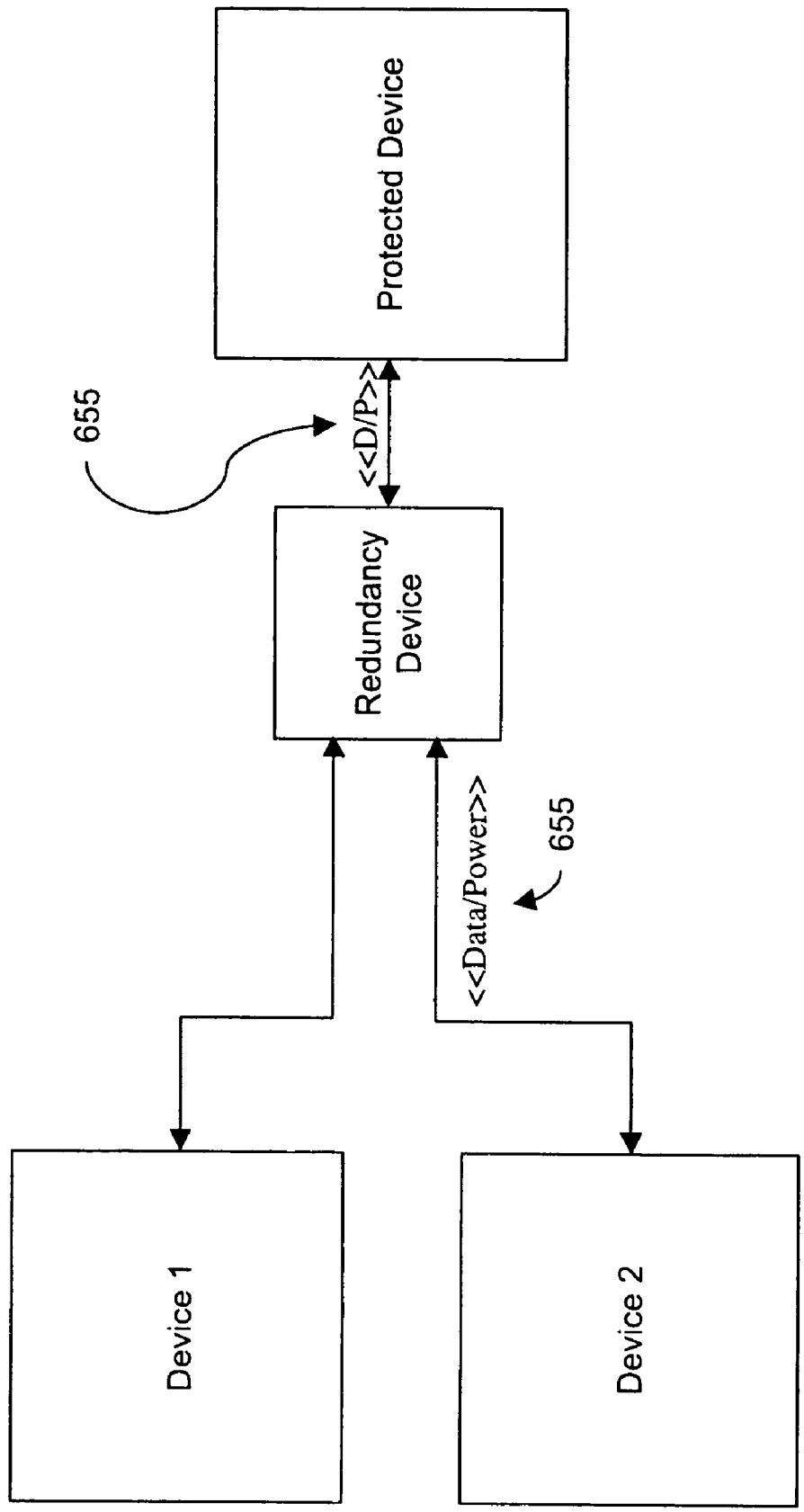

Moving to FIG. 6F, if a failure is detected by Device 2, then a switchover packet 650 may be sent by Device 2 to the redundancy device as shown in FIG. 6F. The redundancy device may then route power and/or data 655 from Device 2 to the protected device that is shown in FIG. 6G.

As can now be seen, the redundancy device of this disclosure provides a simple, inexpensive, and reliable device that allows the relay uplinks to retain control while still providing an intelligent failure detection and healing process. Furthermore, the redundancy device is inline-powered, and does not require the end user to install any extra cabling.

Figure 7A:
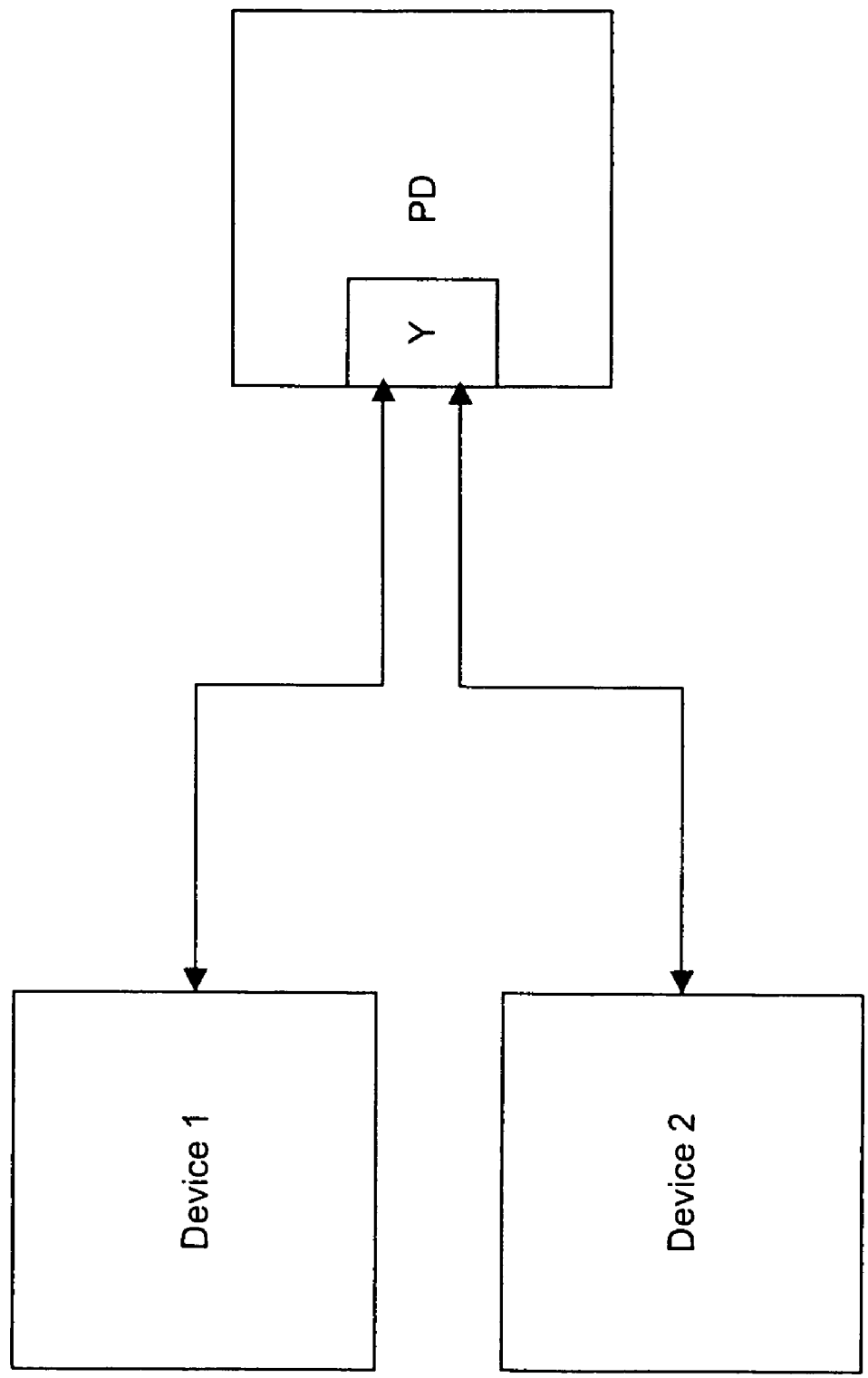
FIGS. 7A and 7B are diagrams illustrating alternative locations for a redundancy device in accordance with this disclosure.
Figure 7B:
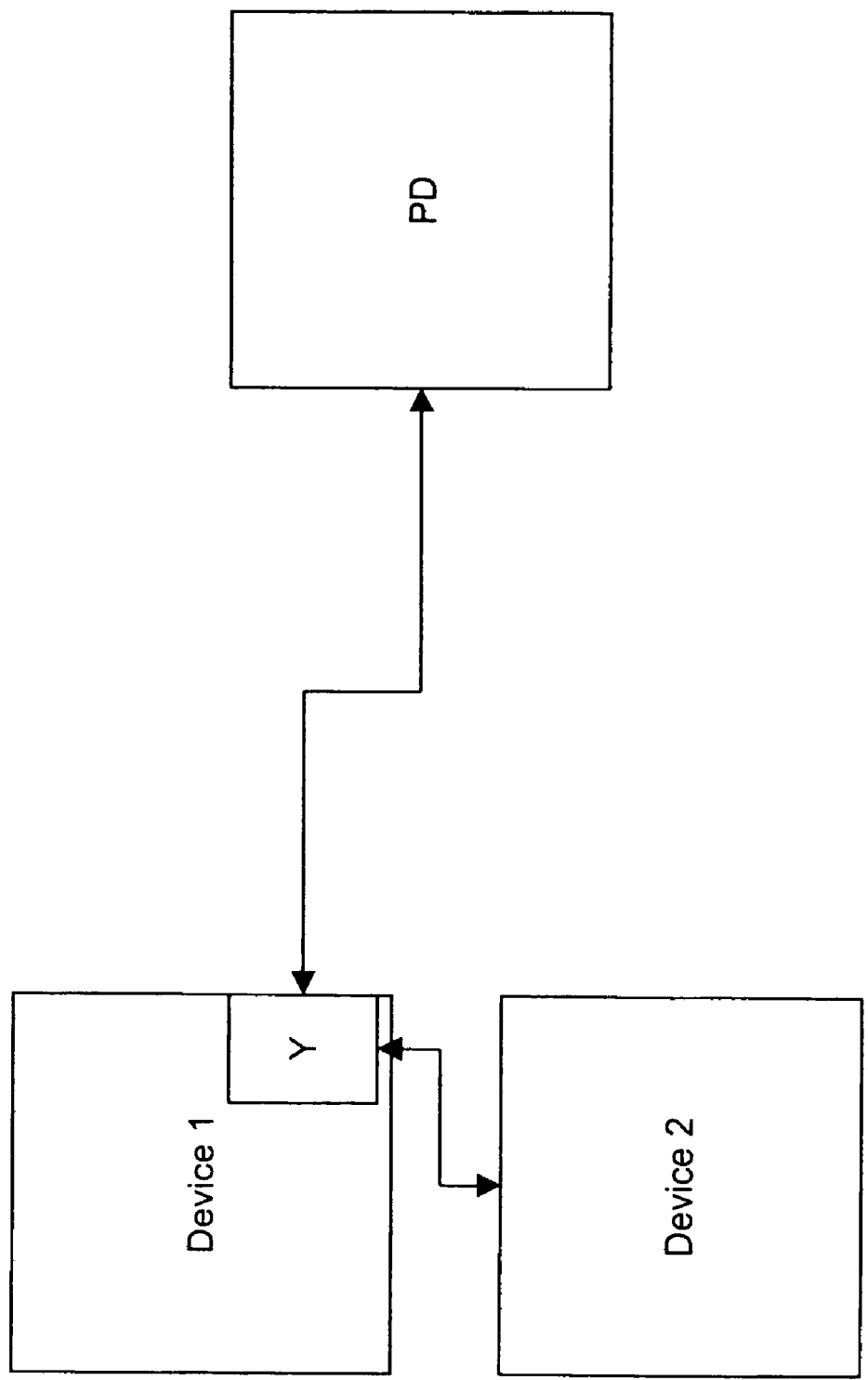

Referring now to FIGS. 7A and 7B, diagrams are presented that show the redundancy device, noted as a "Y" switch in FIGS. 7A and 7B, may disposed in locations other than those shown above. For example, FIG. 7A shows the Y device being disposed within the PD itself. Hence, a PD may have a redundancy device installed as standard or optional equipment.

Alternatively, FIG. 7B shows the redundancy device being disposed in a relay uplink. In this case, the redundant relay uplink (Device 2) may be coupled to the relay uplink that includes the redundancy device (Device 1). In this configuration, only one cable is required between a protected device and the wiring closet were the relay uplinks may be installed.

Figure 8:
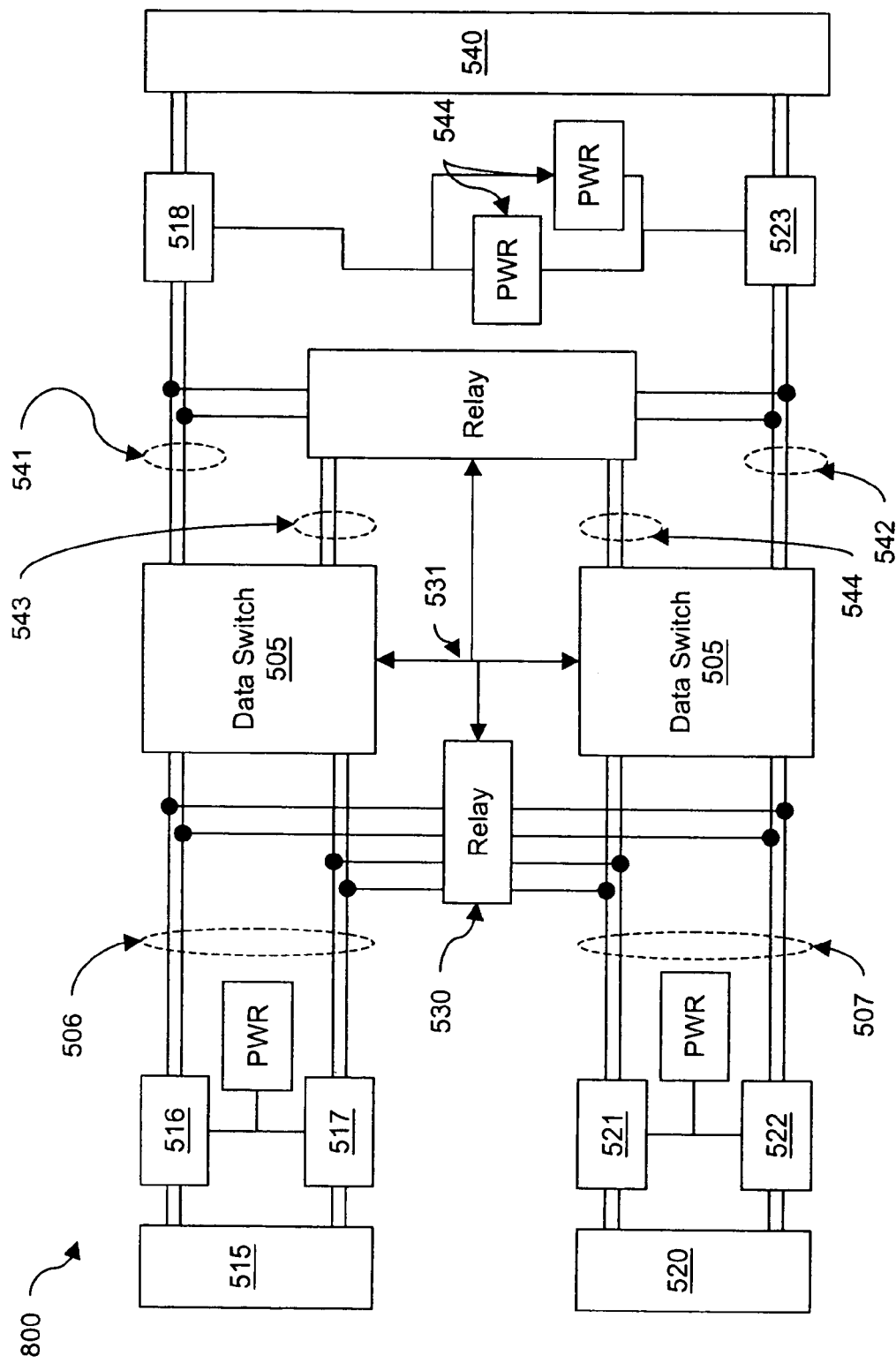
FIG. 8 is a conceptual block diagram of a redundant system further configured to provided multiple redundancy paths in accordance with this disclosure.

FIG. 8 is a conceptual block diagram of a redundant system 800 further configured to provided multiple redundancy paths. The system 800 includes the structure of FIG. 5, with the addition of a pair of redundant data switches 505, and a redundant pair of power sources 544. By providing a pair of data switches and power sources, it will be appreciated that no single point of failure exists in the system of FIG. 8.

The data switches 505 of FIG. 8 may comprise dual integrated circuits that are powered by a power supply that generates local power from two redundant inline power sources coming from the cables connecting the upstream relay uplinks. To power the Y-selector devices, the circuitry for power generation (power sources 544) is in itself redundant as to allow the data switch and all the local power needs to be met if either cable 1 or cable 2 is unplugged or any power failure were to occur within the Y-selector module. It is contemplated that a possible 3rd source of power may be provided, such as a local auxiliary main power. Also a wireless transceiver, such as an 802.11 wireless transceiver (not shown), may exist on the data switch providing a $3_{rd}$ means of communication with both 310 and 320 and may comprise a part of the data switch.

The redundant data switches 505 of FIG. 8 may comprise a wide variety of switching circuitry known in the art, such as signal FETs, i.e., NMOS or PMOS devices, or may comprise diodes and current sources. Alternatively, the data switches may comprise low capacitance mechanical relays configured as is known in the art to route signals from each chip to the passive magnetics in accordance with the teachings of this disclosure.

Figure 9:
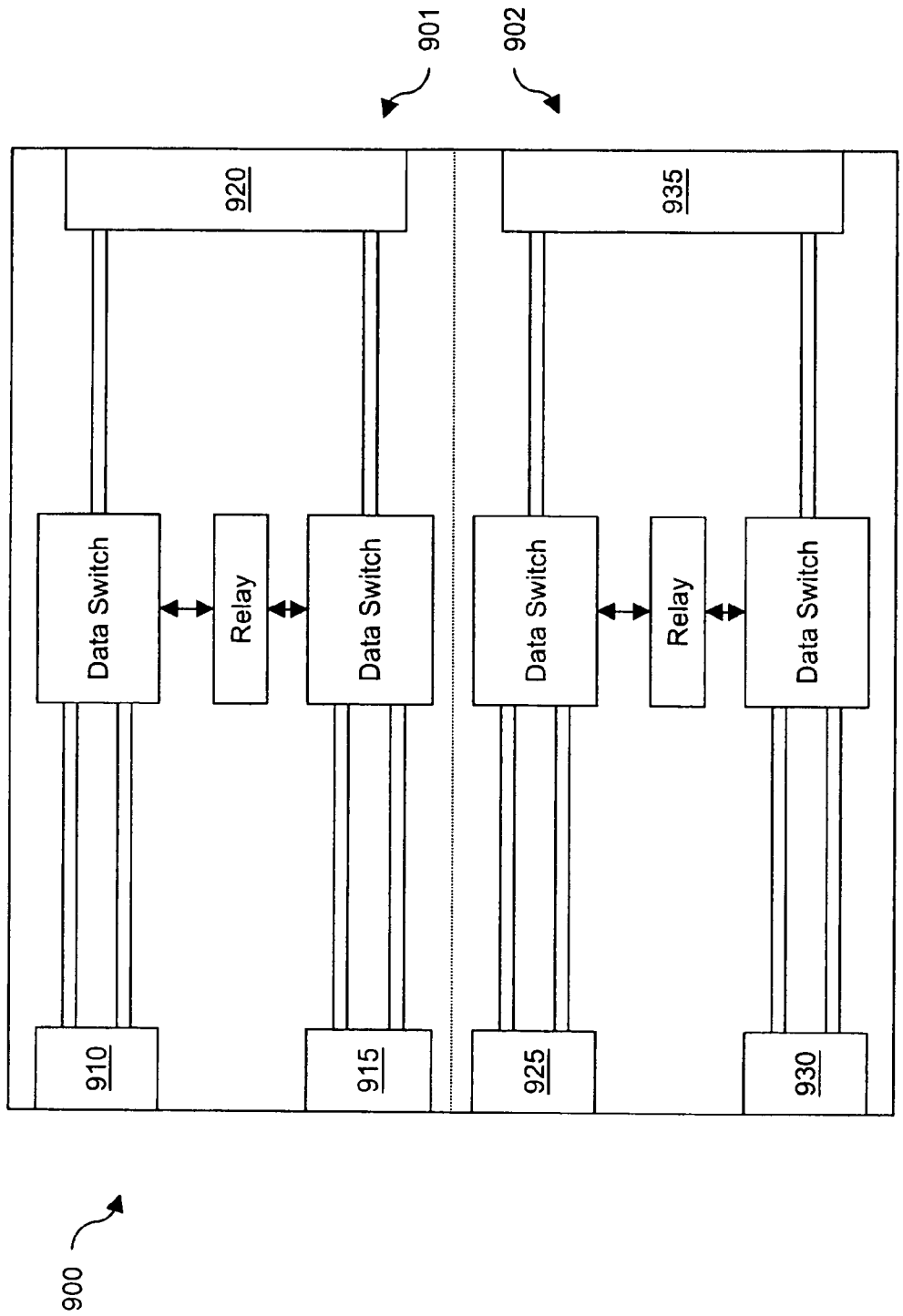
FIGS. 9-11 are conceptual block diagrams of further 4-pair redundant systems in accordance with the teachings of this disclosure.

To switch between the individual data switches and the differential pairs, relay control circuitry 530 may be included and coupled to the data switches 505 through communication paths 531. In the event of a failure of one of the data switches, it is contemplated that the failed transmit circuitry may be shut down, thereby placing the failed unit in a state of high impedance and preventing any undesirable loading. It should be noted that as the relay circuitry typically comprises high impedance devices, serious loading should not be a problem if any of the relay circuitry faults. It is also contemplated that the relay control circuitry may be configured to remove power from the active data switch as a last resort, thereby keeping the device operational should a hard failure occur, allowing the second redundant data switch to take over FIG. 9 is conceptual block diagram of a 4-pair redundant system 900 in accordance with the teachings of this disclosure. The system 900 includes two redundant systems 901 and 902. It is contemplated that each of the systems 901 and 902 may be configured in accordance with FIG. 8 as disclosed above. However, the diagrams of FIG. 9 have been simplified for the sake of discussion.

FIG. 9 shows system 901 as including a pair of differential pairs coupled between connector 910 and a first data switch, and a pair of differential pairs coupled between connector 915 and a second data switch. Relay circuitry is provided to interface with the data switches and select one of the sources to couple to a powered device through connector 920. Likewise, system 902 includes a pair of differential pairs coupled between connector 925 and a first data switch, and a pair of differential (FYI TIM, twisted pairs are in cables these would be traces on the board) pairs coupled between connector 930 and a second data switch. Relay circuitry interfaces one of the sources to a powered device through connector 935.

It will be appreciated that the 4-pair configuration of FIG. 9 may be used in 10/100/1000 Ethernet, and for 10/100 configurations this results in 4-pairs for each device. It is contemplated that 4 data switches may be employed, thereby providing double-redundancy for the powered device. In the case of 1000BaseT, 920 and 935 would be a single RJ45 that is connected to the protected device via a cable. 910, 915 and 925, 930 would also be single RJ45 connector since 1000BaseT requires four-pairs to communicate.

Figure 10:
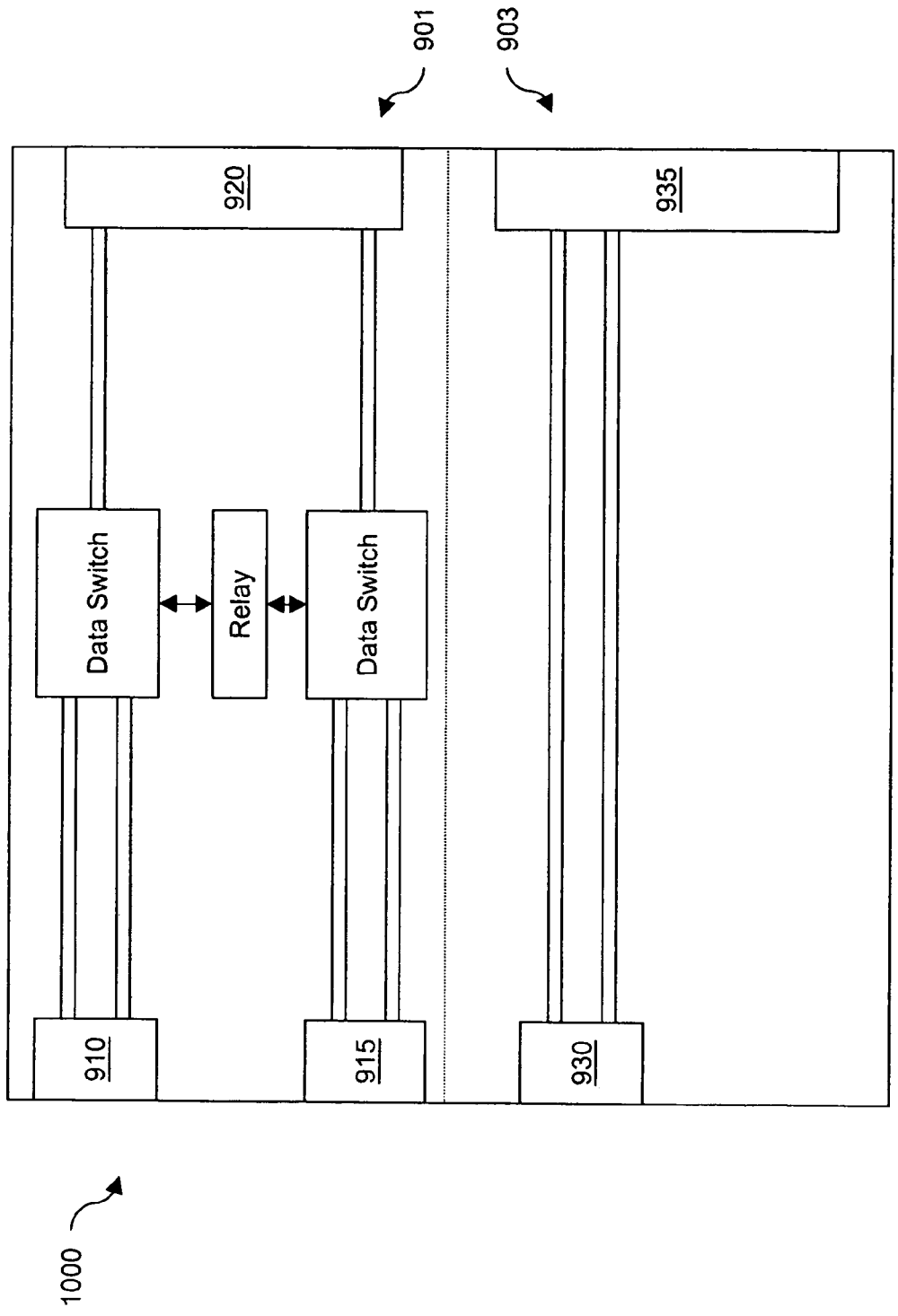

FIG. 10 is conceptual block diagram of another embodiment of a 4-pair redundant system 1000 in accordance with the teachings of this disclosure. System 1000 include a redundant system 901 as disclosed above, and also includes a passive system 903. Again, 901 and 903 may comprise a single RJ45.

To provide additional passive redundancy in an 10/100 Ethernet system, one of the unused pairs presented on connector 930 may be coupled directly to the PD through connector 935 in system 903. It is contemplated that the twisted pairs may be coupled electrically in parallel with the twisted pairs coupled through system 901 and switched in using switching circuitry known in the art. Alternatively, the passive pairs may be made available to the PD through a different port.

As will be appreciated, only one of the relay uplinks (coupled on either pins 1, 2, 3, 6; or 4, 5, 7, 8) may be passively coupled to the PD. However, such a direct connection provides a passive failsafe path to at least one of the relay uplinks in the event of a total failure of the redundancy device.

Figure 11:
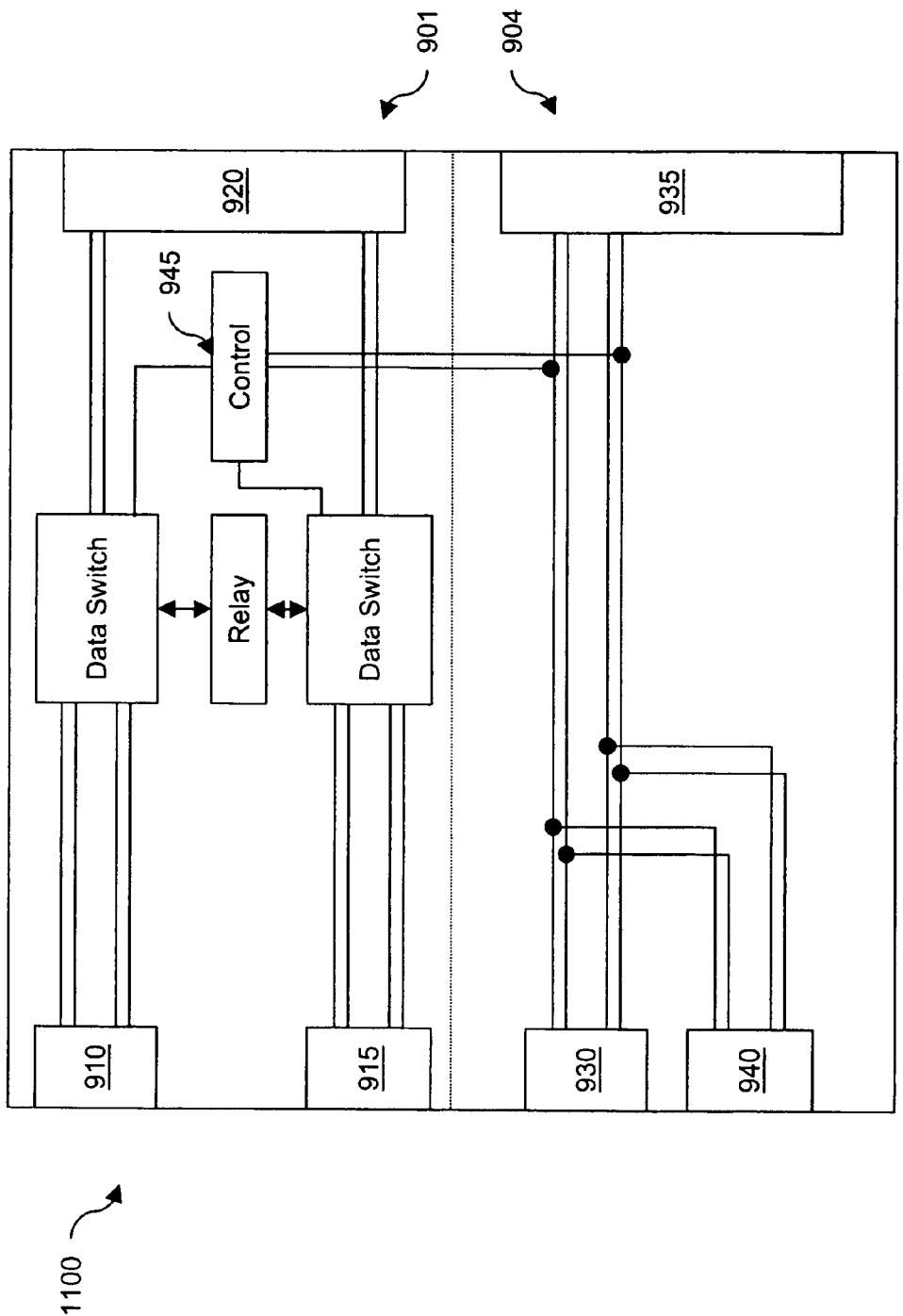

FIG. 11 is a conceptual block diagram of another embodiment of a 4-pair redundant system 1100 in accordance with the teachings of this disclosure. In this embodiment, the system 904 provides for the passive switching of one of the twisted pairs presented on connectors 930 and 940 to connector 935 using control means 945. Methods and apparatus for accomplishing such switching may be found in co-pending application Ser. No. 11/022,288, filed Dec. 23, 2004 and assigned to assignor of this application, and is incorporated herein as though set forth fully. Using passive techniques, a selected one of the twisted pairs from a relay uplink may be directly coupled to the PD, thereby providing yet another redundant source of power and/or data to the PD.

As can now be seen, the redundancy device of this disclosure provides a simple, inexpensive, and reliable device that allows the relay uplinks to retain control while still providing an intelligent failure detection and healing process. Furthermore, the redundancy device is inline-powered, and does not require the end user to install and extra cabling.

While embodiments and applications of this invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the true spirit and scope of this invention.

What is claimed is:

1. An apparatus, comprising:
a first Power Over Ethernet circuit configured to provide data and power to a protected Ethernet device over a downstream connection from an active Ethernet relay uplink device;
a second Power Over Ethernet circuit configured to receive in-line data and power from a plurality of Ethernet relay uplink devices, and to monitor communications between the plurality of Ethernet relay uplink devices, where the active Ethernet relay uplink device is a first member of the plurality of Ethernet relay uplink devices; and
a switchover logic configured to establish a second member of the plurality of Ethernet relay uplink devices as the active Ethernet relay uplink device by:
controlling the second Power Over Ethernet circuit to pass data and power from the second member of the plurality of Ethernet relay uplink devices to the first Power Over Ethernet circuit, in response to receiving, from the second member of the plurality of Ethernet relay uplink devices, a switchover command sent independently of the protected Ethernet device.

2. The apparatus of claim 1, where the communications between the plurality of Ethernet relay uplink devices are effected using packet-based communication over an Ethernet link.

3. The apparatus of claim 2, where the plurality of Ethernet relay uplink devices are configured to test the integrity of the connection between the apparatus and the active uplink device, and to issue the switchover command responsive to a determination that the active Ethernet relay uplink device has failed.

4. The apparatus of claim 3, where the communications between the plurality of Ethernet relay uplink devices are performed responsive to an indication inserted in the packet in place of the destination media access control (MAC) address of the packet.

5. The apparatus of claim 3, where the apparatus receives in-line power from the plurality of relay uplink devices.

6. The apparatus of claim 1, where the plurality of Ethernet relay uplink devices are configured to test the integrity of their connection to the apparatus.

7. The apparatus of claim 1, wherein the second member of the plurality of Ethernet relay uplink devices is configured to issue the switchover command responsive to determining that the active Ethernet relay uplink device has failed, wherein determining that the active Ethernet relay uplink device has failed comprises:
  verifying that a link between the second member and the apparatus is operational, via receipt of one or more loopback packets echoed by the apparatus via the link; and
  verifying that at least one of (i) the active Ethernet relay uplink device and (ii) a link between the active Ethernet relay uplink device and the apparatus is not operational, via non-receipt of a predetermined number connectivity check packets from the active Ethernet relay uplink device within a predetermined time period.

8. A redundancy device for providing redundancy for communications and inline power to a protected Ethernet device in a wired data telecommunications network, comprising:
  a first data switch configured to receive data and power from a first and second upstream Ethernet source over respective differential signal pairs;
  a power source for supplying inline power to the differential signal pairs;
  the first data switch including control circuitry for selectively routing power and data from one of the first and second upstream sources to a downstream Ethernet powered device, in response to receiving, from the one of the first and second upstream sources, a switchover command sent independently of the protected Ethernet device.

9. The redundancy device of claim 8, where the device is configured to perform an operation responsive to an indication in a destination MAC address of a received packet.

10. The redundancy device of claim 9, where the switching and control circuitry are configured to perform a lookup operation and execute a fetched operation corresponding with a decoded address in a table.

11. The redundancy device of claim 10, where the switching and control circuitry are configured to switch data and traffic flow between the upstream sources and the Ethernet powered device responsive to the indication contained in the received packet.

12. The redundancy device of claim 11, comprising a second data switch operatively coupled to the first data switch through relay control circuitry, the relay control circuitry being configured to pass power and data through the second data switch in the event of a failure of the first data switch.

13. The redundancy device of claim 11, where the first data switch is placed in a state of high impedance in the event of a failure.

14. A redundancy device for providing redundancy for communications and inline power to a protected Ethernet device in a wired Power Over Ethernet (PoE) network comprising:
  first data switching means for receiving data and power from a first and second upstream Ethernet source over respective differential signal pairs;
  power source means for supplying inline power to the differential pairs;
  the first data switching means including switching and control means for routing power and data from a selected one of the first and second upstream sources to a downstream Ethernet powered device, in response to receiving, from the one of the first and second upstream sources, a switchover command sent independently of the protected Ethernet device.

15. The redundancy device of claim 14, where the switching and control means are configured to switch data and traffic flow between the upstream sources and the Ethernet powered device responsive to an indication contained in a received packet.

16. The redundancy device of claim 15, comprising second data switching operatively coupled to the first data switching means, the device comprising relay control circuitry means for passing power and data through the second data switching means in the event of a failure of the first data switching means.

17. The redundancy device of claim 16, where the first data switching means is placed in a state of high impedance in the event of a failure.

18. A device, comprising:
  a plurality of relay uplink ports configured to provide data and inline power to the device;
  where a member of the plurality of relay uplink ports provides inline power and data from an active source to the device;
  where the device is configured to selectively provide power and data over a downstream port to a protected device, and
  where the device is configured to switch to providing, over the downstream port to the protected device, power and data from an inactive source and via a member of the plurality of relay uplink ports that sent a switchover command independently of the device, in response to receiving the switchover command in communications on the plurality of relay uplink ports.

19. The device of claim 18, where the plurality of relay uplink ports are configured to issue a switchover communication to the device responsive to a determination that the active source has failed.

20. The device of claim 19, where the switchover communication includes replacing a destination MAC address of a packet with a switchover command for the device.

* * * * *